US008458667B2

(12) United States Patent
Hartadinata

(10) Patent No.: US 8,458,667 B2
(45) Date of Patent: Jun. 4, 2013

(54) DEBUGGING A STATECHART FOR A REAL TIME TARGET

(75) Inventor: Toga Hartadinata, Austin, TX (US)

(73) Assignee: National Instruments Corporation, Austin, TX (US)

( * ) Notice: Subject to any disclaimer, the term of this patent is extended or adjusted under 35 U.S.C. 154(b) by 909 days.

(21) Appl. No.: 12/356,207

(22) Filed: Jan. 20, 2009

(65) Prior Publication Data

US 2009/0193396 A1 Jul. 30, 2009

Related U.S. Application Data

(60) Provisional application No. 61/024,783, filed on Jan. 30, 2008.

(51) Int. Cl.
*G06F 9/44* (2006.01)
(52) U.S. Cl.
USPC ............................................ 717/125; 717/124
(58) Field of Classification Search
USPC ..... 717/101–178; 463/42; 709/220; 715/735; 705/34
See application file for complete search history.

(56) References Cited

U.S. PATENT DOCUMENTS

| 4,802,116 | A | 1/1989 | Ward et al. |
|---|---|---|---|
| 4,827,404 | A | 5/1989 | Barstow et al. |
| 4,849,880 | A | 7/1989 | Bhaskar et al. |
| 4,901,221 | A | 2/1990 | Kodosky et al. |
| 4,914,568 | A | 4/1990 | Kodosky et al. |
| 5,109,504 | A | 4/1992 | Littleton |
| 5,377,318 | A | 12/1994 | Wolber |
| 5,437,464 | A | 8/1995 | Terasima et al. |
| 5,481,740 | A | 1/1996 | Kodosky |
| 5,563,991 | A | 10/1996 | Mahoney |
| 5,566,295 | A | 10/1996 | Cypher et al. |
| 5,603,018 | A | 2/1997 | Terada et al. |
| 5,652,909 | A | 7/1997 | Kodosky |
| 5,724,074 | A | 3/1998 | Chainani et al. |
| 5,760,788 | A | 6/1998 | Chainini et al. |
| 5,784,275 | A | 7/1998 | Sojoodi et al. |
| 5,870,590 | A | 2/1999 | Kita et al. |

(Continued)

FOREIGN PATENT DOCUMENTS

WO 96 14618 5/1996

OTHER PUBLICATIONS

NPL—Dynamic Mapping of Runtime Information Models for Debugging Embedded Software—Philipp Graf and Klaus D. Muller-Glaser University of Karlsruhe Laboratory for Information Processing Technology (ITIV)—Jun. 16, 2006.*

(Continued)

*Primary Examiner* — Leweis A Bullock, Jr.
*Assistant Examiner* — Francisco Aponte
(74) *Attorney, Agent, or Firm* — Meyertons Hood Kivlin Kowert & Goetzel, P.C.; Jeffrey C. Hood; Joel L. Stevens

(57) ABSTRACT

System and method for debugging a statechart on a target device. The statechart may be created or displayed on a display and may include a plurality of state icons connected by wires. One or more debugging operations may be specified for the statechart. The statechart may be executed on the target device. The target device may provide debugging information to a computer during execution of the statechart. The debugging information may be displayed on the computer and may be usable to aid in debugging the statechart.

19 Claims, 13 Drawing Sheets

U.S. PATENT DOCUMENTS

| | | | |
|---|---|---|---|
| 5,920,718 | A | 7/1999 | Uczekaj et al. |
| 5,966,532 | A | 10/1999 | McDonald et al. |
| 6,118,448 | A | 9/2000 | McMillan et al. |
| 6,138,171 | A | 10/2000 | Walker |
| 6,173,438 | B1 | 1/2001 | Kodosky et al. |
| 6,212,672 | B1 | 4/2001 | Keller et al. |
| 6,219,628 | B1 | 4/2001 | Kodosky et al. |
| 6,285,976 | B1 | 9/2001 | Rotbart |
| 6,366,300 | B1 | 4/2002 | Ohara et al. |
| 6,405,361 | B1 | 6/2002 | Broy et al. |
| 6,499,136 | B1 | 12/2002 | Dempsey et al. |
| 6,715,139 | B1 | 3/2004 | Kodosky et al. |
| 6,880,147 | B1 | 4/2005 | Pauly |
| 7,020,850 | B2 | 3/2006 | Raghavan et al. |
| 7,028,056 | B1* | 4/2006 | Hendel et al. ............... 1/1 |
| 7,120,876 | B2 | 10/2006 | Washington et al. |
| 7,197,739 | B2 | 3/2007 | Preston et al. |
| 7,200,838 | B2 | 4/2007 | Kodosky et al. |
| 7,210,117 | B2 | 4/2007 | Kudukoli et al. |
| 7,359,831 | B2* | 4/2008 | Shrivastava et al. .......... 702/182 |
| 7,464,373 | B1 | 12/2008 | Yunt et al. |
| 7,496,895 | B1* | 2/2009 | Mosterman et al. .......... 717/124 |
| 7,503,027 | B1 | 3/2009 | Zhao et al. |
| 7,774,172 | B1 | 8/2010 | Yunt et al. |
| 7,840,913 | B1 | 11/2010 | Agrawal et al. |
| 2001/0020291 | A1 | 9/2001 | Kudukoli et al. |
| 2002/0070968 | A1 | 6/2002 | Austin et al. |
| 2003/0046663 | A1 | 3/2003 | Rogers et al. |
| 2003/0084127 | A1* | 5/2003 | Budhiraja et al. ............ 709/220 |
| 2003/0106042 | A1* | 6/2003 | Lynch et al. ................. 717/109 |
| 2003/0134677 | A1* | 7/2003 | Obied et al. .................... 463/42 |
| 2003/0167455 | A1 | 9/2003 | Iborra et al. |
| 2004/0031019 | A1* | 2/2004 | Lamanna et al. ............. 717/125 |
| 2005/0010504 | A1* | 1/2005 | Gebhard et al. ................ 705/34 |
| 2005/0091602 | A1 | 4/2005 | Ramamoorthy et al. |
| 2007/0074184 | A1* | 3/2007 | Raghavan et al. ............ 717/138 |
| 2007/0168943 | A1 | 7/2007 | Marini et al. |
| 2007/0266368 | A1* | 11/2007 | Szpak et al. .................. 717/105 |
| 2008/0147364 | A1* | 6/2008 | Davis et al. ...................... 703/6 |
| 2008/0148237 | A1* | 6/2008 | Jiang et al. ................... 717/124 |
| 2008/0263463 | A1 | 10/2008 | Neumann |
| 2008/0263521 | A1* | 10/2008 | Neumann et al. ............. 717/125 |

OTHER PUBLICATIONS

NPL—Visualization of the execution of Real-Time Statecharts—Matthias Tichy and Margarete Kudak Software Engineering Group University of Paderborn—2003.*

Dynamic Mapping of Runtime Information Models for Debugging Embedded Software; Philipp Graf and Klaus D. Müller-Glaser; University of Karlsruhe Laboratory for Information Processing Technology (ITIV) Engesserstr. 5, 76131 Karlsruhe, Germany; May 2, 2006.*

Visualization of the execution of Real-Time Statecharts; Matthias Tichy and Margarete Kudak Software Engineering Group University of Paderborn Warburgerstr. 100 33095 Paderborn; 2003.*

Eva Magnusson; "State diagram Generation" term paper in the graduate course Attribute Grammars; Spring 1999; 21 pages; Lund University.

Simona Vasilache and Jiro Tanaka; "Translating OMT State Diagrams with Concurrency into SDL Diagrams"; Aug. 28-31, 2000; 6 pages plus cover page; University of Tsukuba, Japan.

"Stateflow—For State Diagram Modeling" User's Guide, Version 4; Copyright 1997-2001; pp. 1 through 8-10; The Math Works, Inc.

"Stateflow—For State Diagram Modeling" User's Guide, Version 4; Copyright 1997-2001; pp. 8-11 through 1-16; The Math Works, Inc.

T. Dean Hendrix and James H. Cross; Language Independent Generation of Graphical Representations of Source Code; Proceedings of the 1995 ACM 23rd annual conference on Computer Science; 1995; pp. 66-72.

Hugo Andrade and Scott Kovner; "Software Synthesis from Dataflow models for G and LabVIEW"; IEEE Asilomar Conference on Signals, Systems, and Computers; Nov. 1998; pp. 1705-1709; vol. 2.

K. N. Whitley and Alan F. Blackwell; "Visual Programming: The Outlook from Academia and Industry"; Seventh workshop on Empirical studies of programmers; Oct. 1997; pp. 180-208.

David Harel and Eran Gery; "Executable Object Modeling with Statecharts"; IEEE Computer; Jul. 1997; pp. 31-42; vol. 30, No. 7.

David Harel; "On Visual Formalisms"; Communications of the ACM; May 1988; pp. 514-530; vol. 31, No. 5.

David Harel; "Statecharts: A Visual Formalism for Complex Systems"; 1987; pp. 231-257; Elsevier Science Publishers B.V., North Holland.

"LabVIEW User Manual for Windows"; National Instruments Co.; Sep. 1994; 22 pages.

Adam Beguelin, Jack Dongarra, Al Geist, and Vaidy Sunderam; "Visualization and Debugging in a Heterogeneous Environment"; IEEE; Jun. 1993; 8 pages.

Rahman Jamal and Lothar Wenzel; "The Applicability of the Visual Programming Language LabVIEW to Large-Real-World Applications"; IEEE; 1995; 8 pages.

Per-Arne Wiberg; "Graphical Programming of Time-Deterministic Real-Time Systems"; IEEE; 1996; 8 pages.

Bruce D. Douglass; "Custom Embedded Communication Protocols"; Conference Proceedings of Embedded Systems Conference East, Mar. 10-12, 1997, Boston, Massachusetts; 21 pages.

Jean Labrosse; "Inside Real-Time Kernals"; Conference Proceedings of Embedded Systems Conference East, Mar. 10-12, 1997, Boston, Massachusetts; 10 pages.

Jean Labrosse; "Designing with Real-Time Kernals"; Conference Proceedings of Embedded Systems Conference East, Mar. 10-12, 1997, Boston, Massachusetts; 11 pages.

William Stallings; "Operating Systems, 2nd Edition"; Prentice Hall; 1995; "Multiprocessor and Real-Time Scheduling", 21 pages.

International Search Report for PCT/US 98/10916 dated Sep. 17, 1998; 7 pages.

Sam Shearman; "Hardware-in-the-Loop Connectivity Extends Continuous-System Simulation"; Personal Engineering, Jun. 1997; 11 pages.

"LabVIEW User Manual for Windows"; National Instruments Co.; Aug. 1993; 11 pages.

Frank Ludolph, Yu-Ying Chow, Dan Ingalls, Scott Wallace, and Ken Doyle; "The Fabrik Programming Environment"; IEEE; 1988; 9 pages.

Philip Dean Lapsley; "Host Interface and Debugging of Dataflow DSP Systems"; Thesis, 1991, 56 pages.

Edward A. Lee, Edwin Goei, Holly Heine, Wai Ho, Shuvra Bhattacharyya, Jeff Bier, and Erik Guntvedt; "Gabriel: A Design Environment for Programmable DSPs"; 1988; 13 pages.

Edward A. Lee, Wai-Hung Ho, Edwin E. Goei, Jeffrey C. Bier, and Shuvra Bhattacharyya; "Gabriel: A Design Environment for DSP"; IEEE Transactions on Acoustics, Speech, and Signal Processing, vol. 37, No. 11, Nov. 1989; 12 pages.

Jeffrey C. Bier, Edwin E. Goei, Wai H. Ho, Philip D. Lapsley, Maureen P. O'Reilly, Gilbert C. Sih, and Edward A Lee; "Gabriel: A Design Environment for DSP", IEEE Micro Issue—vol. 10, No. 5, 1990, 16 pages.

* cited by examiner

DEBUGGING A STATECHART FOR A REAL TIME TARGET

PRIORITY CLAIM

This application claims benefit of priority of U.S. provisional application Ser. No. 61/024,783, titled "Debugging a Statechart in Real Time Target", filed Jan. 30, 2008, whose inventor is Toga Hartadinata and which is hereby incorporated by reference in its entirety as though fully and completely set forth herein.

FIELD OF THE INVENTION

The present invention relates to the field of statecharts, and more particularly to a system and method for configuring and debugging statecharts executing on a real time target.

DESCRIPTION OF THE RELATED ART

Diagrams representing finite state machines (FSMs) have become an increasingly popular way to model and understand systems. Examples include State diagrams and Harel statecharts (referred to herein as statecharts). State diagrams classically include a series of states, state transitions, events, and actions. During execution of such diagrams, a state may transition from one state to another in response to an event. The transition taken may be determined by evaluating conditions associated with each of the specified state transitions. When the conditions for a transition are true, the transition may occur. Additionally, actions may be executed when states are entered or exited (e.g., according to the transitions), in response to a trigger, and/or at other times. In general, state diagrams do not allow for multiple states to be concurrently active.

Statecharts, in contrast, do allow for multiple states to be concurrently active. For example, in statecharts, a superstate may include a plurality of substates that may be concurrently active when the superstate is active.

While previous systems have allowed for debugging of statecharts (e.g., using LabVIEW® products provided by National Instruments Inc.), it has not been possible to debug statecharts executing on a remote target, such as a real time target. Thus, improvements in statechart debugging are desirable.

SUMMARY OF THE INVENTION

Various embodiments are presented below of methods for configuring and debugging statecharts executing on a real time target.

The real time target may be configured according to a statechart and one or more debugging specifications. The statechart may include a plurality of state icons connected by lines or wires. The state icons may correspond to respective states and the wires may correspond to transitions to and from the states.

The one or more debugging specifications may specify one or more debugging operations (e.g., breakpoints or other debugging operations). The one or more debugging specifications may include a table which is usable to provide the debugging information to the host computer. Alternatively, or additionally, the one or more debugging specifications may include one or more graphical programs which may be executable to perform the one or more debugging operations.

Configuring the real time target may include storing at least a portion of the statechart in a memory medium of the real time target. Alternatively, or additionally, configuring the real time target may include configuring a programmable hardware element of the real time target according to the statechart. Furthermore, configuring the real time target may include deploying a real time operating system to the real time target.

The statechart may be executed on the real time target. Executing the statechart on the real time target may include performing the one or more debugging operations, e.g., by executing the one or more graphical programs included in the one or more debugging specifications. Executing may further include generating debugging information based on the one or more debugging specifications.

The debugging information may be provided to the host computer for display. The debugging information may be useable to evaluate execution of the statechart on the real time target for debugging.

One or more debugging commands may be received from the host computer during execution of the statechart. Accordingly, one or more additional debugging operations may be performed in response to the one or more debugging commands.

The method described above may be implemented as a software program. For example, a memory medium of the real time target may include program instructions which are executable to perform the above method. Similarly, the method may be performed by a real time device or a system including the real time device.

The method may also be performed by a host computer coupled to the real time target. For example, the statechart may be displayed on the display of the host. Information may be provided from the host to configure the real time target according to the statechart and one or more debugging specifications.

Similar to above, the statechart may be executed on the real time target, which may include performing the one or more debugging operations. Executing the statechart on the real time target may include providing debugging information to the host based on the one or more debugging specifications.

Accordingly, the debugging information may be received and may be usable to evaluate execution of the statechart. The debugging information on the display of the host. Similar to above, the method may be implemented as a software program, e.g., stored in a memory medium of the host. Thus, the host computer system may be configured to perform the above-described method.

BRIEF DESCRIPTION OF THE DRAWINGS

A better understanding of the present invention can be obtained when the following detailed description of the preferred embodiment is considered in conjunction with the following drawings, in which.

Figure 1A:
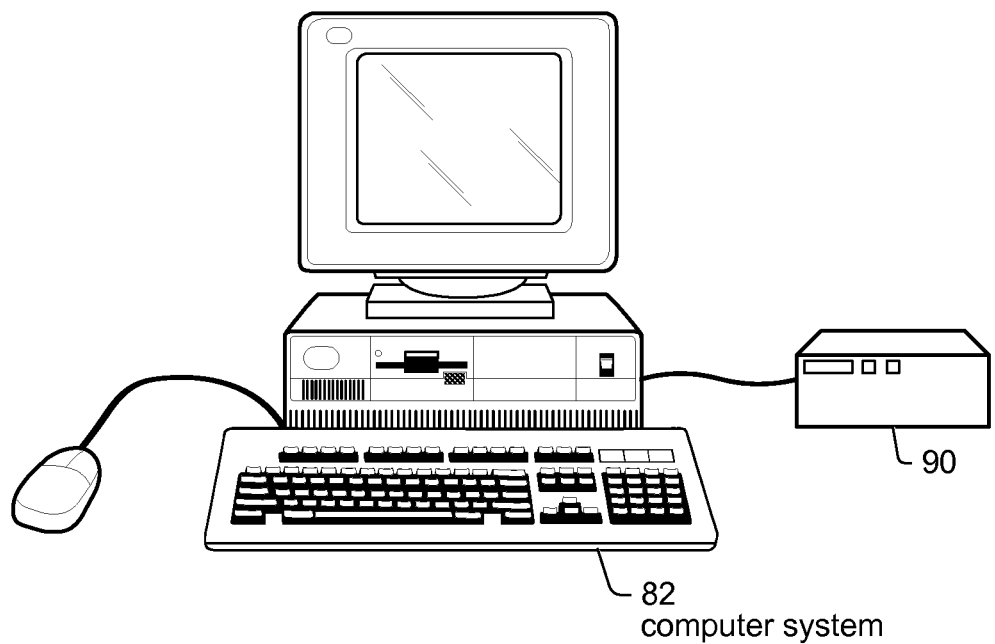
FIG. 1A illustrates a computer system and a target system operable to execute and debug a statechart according to an embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Pat. No. 7,200,838 titled "Method for Automatically Generating a Graphical Program in Response to a State Diagram," filed Dec. 21, 2000.

U.S. Patent Application Publication No. 20010020291 (Ser. No. 09/745,023) titled "System and Method for Programmatically Generating a Graphical Program in Response to Program Information," filed Dec. 20, 2000, which issued as U.S. Pat. No. 7,210,117 on Apr. 24, 2007.

U.S. Pat. No. 6,715,139 titled, "System and Method for Providing and Displaying Debugging Information of a Graphical Program on a First Computer During Execution of the Graphical Program on a Second Computer", filed Aug. 3, 2000.

U.S. patent application Ser. No. 11/743,287 titled, "Debugging a Statechart Using a Graphical Program", filed May 2, 2007.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected blocks or icons, wherein the plurality of interconnected blocks or icons visually indicate functionality of the program.

The following provides examples of various aspects of graphical programs. The following examples and discussion are not intended to limit the above definition of graphical program, but rather provide examples of what the term "graphical program" encompasses:

The blocks in a graphical program may be connected in one or more of a data flow, control flow, and/or execution flow format. The blocks may also be connected in a "signal flow" format, which is a subset of data flow.

Exemplary graphical program development environments which may be used to create graphical programs include LabVIEW®, DasyLab™, DiaDem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks are often referred to as the block diagram portion of the graphical program.

Block—In the context of a graphical program, an element that may be included in a graphical program. A block may have an associated icon that represents the block in the graphical program, as well as underlying code or data that implements functionality of the block. Exemplary blocks include function blocks, sub-program blocks, terminal blocks, structure blocks, etc. Blocks may be connected together in a graphical program by connection icons or wires.

The blocks in a graphical program may also be referred to as graphical program nodes or simply nodes.

Wire—a graphical element displayed in a diagram on a display that connects icons or nodes in the diagram. The diagram may be a graphical program (where the icons correspond to software functions), a system diagram (where the icons may correspond to hardware devices or software functions), etc. The wire is generally used to indicate, specify, or implement communication between the icons. Wires may represent logical data transfer between icons, or may represent a physical communication medium, such as Ethernet, USB, etc. Wires may implement and operate under various protocols, including data flow semantics, non-data flow semantics, etc. Some wires, e.g., buffered data transfer wires, may be configurable to implement or follow specified protocols or semantics.

Wires may indicate communication of data, timing information, status information, control information, and/or other information between icons. In some embodiments, wires may have different visual appearances which may indicate different characteristics of the wire (e.g., type of data exchange semantics, data transfer protocols, data transfer mediums, and/or type of information passed between the icons, among others).

Where wires are displayed in state diagrams or statecharts, the wires may indicate transitions between states that are represented as state icons in the state diagram or statechart.

Graphical Data Flow Program (or Graphical Data Flow Diagram)—A graphical program or diagram comprising a plurality of interconnected blocks, wherein at least a subset of the connections among the blocks visually indicate that data produced by one block is used by another block. A LabVIEW VI is one example of a graphical data flow program. A Simulink block diagram is another example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input the by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Statechart—A diagram that visually indicates a plurality of states and transitions between the states. The diagram comprises state icons connected by wires, where the state icons represent states and the wires represent transitions between the states.

One or more of the state icons may represent a hierarchical state, where a hierarchical state is a state that includes one or more sub-states. For example, a statechart may include a state (a superstate) which includes states (substates). The substates may be AND states (e.g., parallel or concurrently active states) or OR states (e.g., states which are not concurrently active). The statechart may also include pseudostates (e.g., forks, joins, and/or junctions).

The statechart may be represented in the memory of the computer system as data structures and/or program instructions. The representation of the statechart stored in memory corresponds to the diagram and is either 1) executable; 2) operable to be converted to an executable program; or 3) interpretable, to perform the functionality indicated by the diagram.

A "State Diagram" is a type of statechart which does not have hierarchical states.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Subset—in a set having N elements, the term "subset" comprises any combination of one or more of the elements, up to and including the full set of N elements. For example, a subset of a plurality of icons may be any one icon of the plurality of the icons, any combination of one or more of the icons, or all of the icons in the plurality of icons. Thus, a subset of an entity may refer to any single element of the entity as well as any portion up to and including the entirety of the entity.

FIG. 1A—Computer System and Target System

FIG. 1A illustrates a computer system 82 and a target system 90 operable to implement the methods described herein. One embodiment of a method for debugging a statechart executing on a target system is described below.

As shown in FIG. 1A, the computer system 82 may include a display device operable to display the statechart as the statechart is created and/or executed. The display device may also be operable to display a graphical user interface (e.g., a data viewer or debugging GUI) of the statechart during execution of the statechart. The graphical user interface may comprise any type of graphical user interface, e.g., depending on the computing platform.

The computer system 82 may include at least one memory medium on which one or more computer programs or software components according to one embodiment of the present invention may be stored. For example, the memory medium may store one or more statecharts and/or graphical programs which are executable to perform the methods described herein. Additionally, the memory medium may store a development environment application used to create and/or execute such statecharts and/or graphical programs. The memory medium may also store operating system software, as well as other software for operation of the computer system. Various embodiments further include receiving or storing instructions and/or data implemented in accordance with the foregoing description upon a carrier medium.

The target system 90 may be any of various target systems. For example, the target system 90 may be an embedded system without a display. The target system 90 may include a programmable hardware element and/or may include a processor and memory medium which may execute a real time operating system. In one embodiment, a graphical program/statechart may be downloaded and executed on the target system 90. For example, the development environment may provide support for downloading the graphical program and/or statechart for execution on the target system, e.g., in a real time system. Further descriptions of the target system 90 are provided below.

Figure 1B:
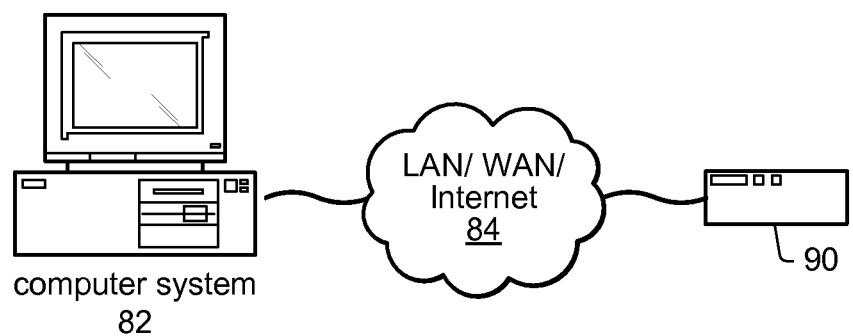
FIG. 1B illustrates a network system comprising the computer system and the target system that may implement an embodiment.

FIG. 1B—Computer Network

FIG. 1B illustrates a system including the computer system 82 coupled to the target system 90. The computer system 82 may be coupled via a network 84 (or a computer bus) to the target system 90. The network 84 may be any of various types, including a LAN (local area network), WAN (wide area network), the Internet, or an Intranet, among others. The computer system 82 and the target system 90 may execute a statechart or graphical program (which may include the statechart) in a distributed fashion. For example, computer 82 may execute a first portion of the statechart (e.g., a graphical debugging portion) and the target system 90 may execute a second portion of the statechart.

Figure 2A:
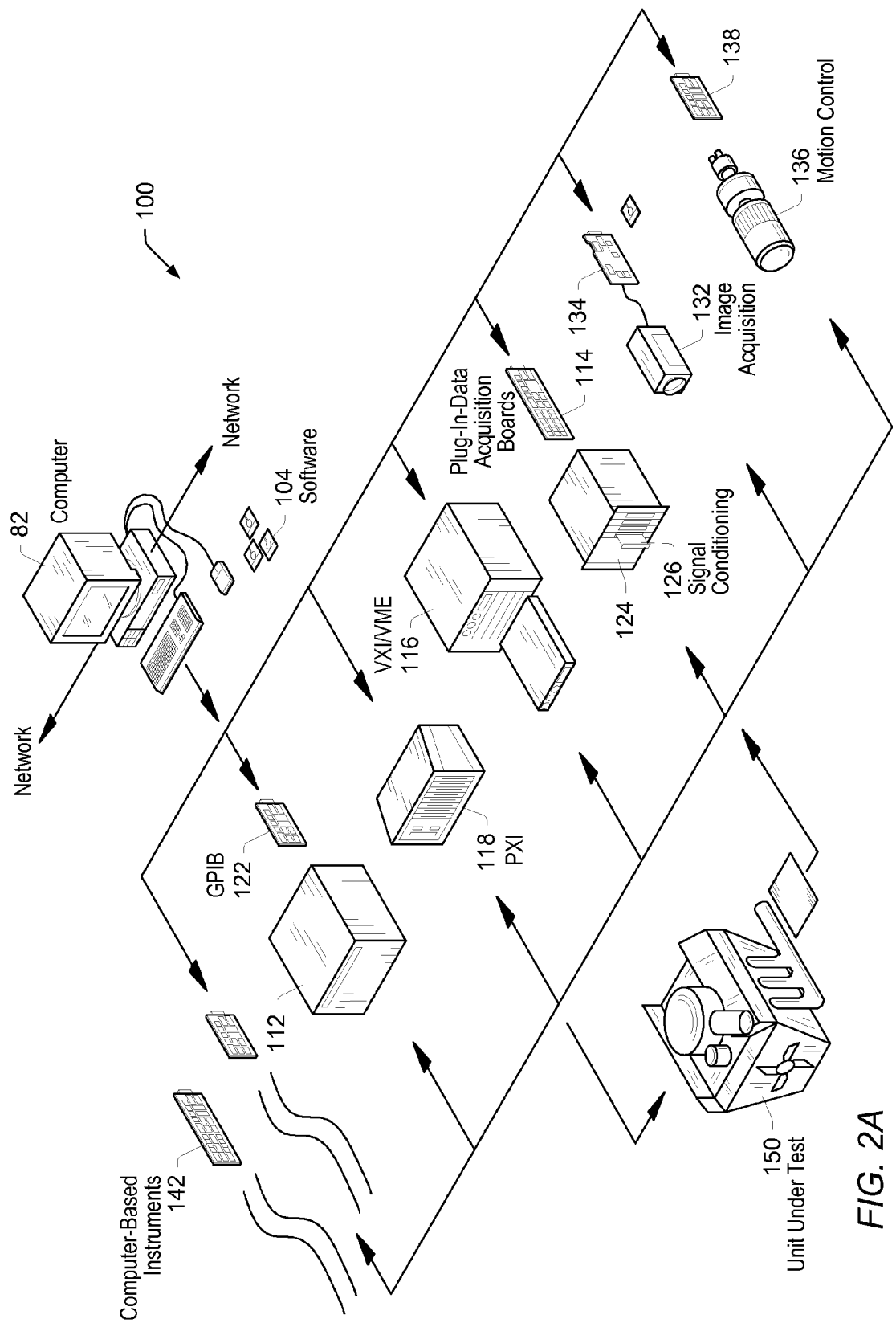
FIG. 2A illustrates an instrumentation control system according to one embodiment.
Figure 2B:
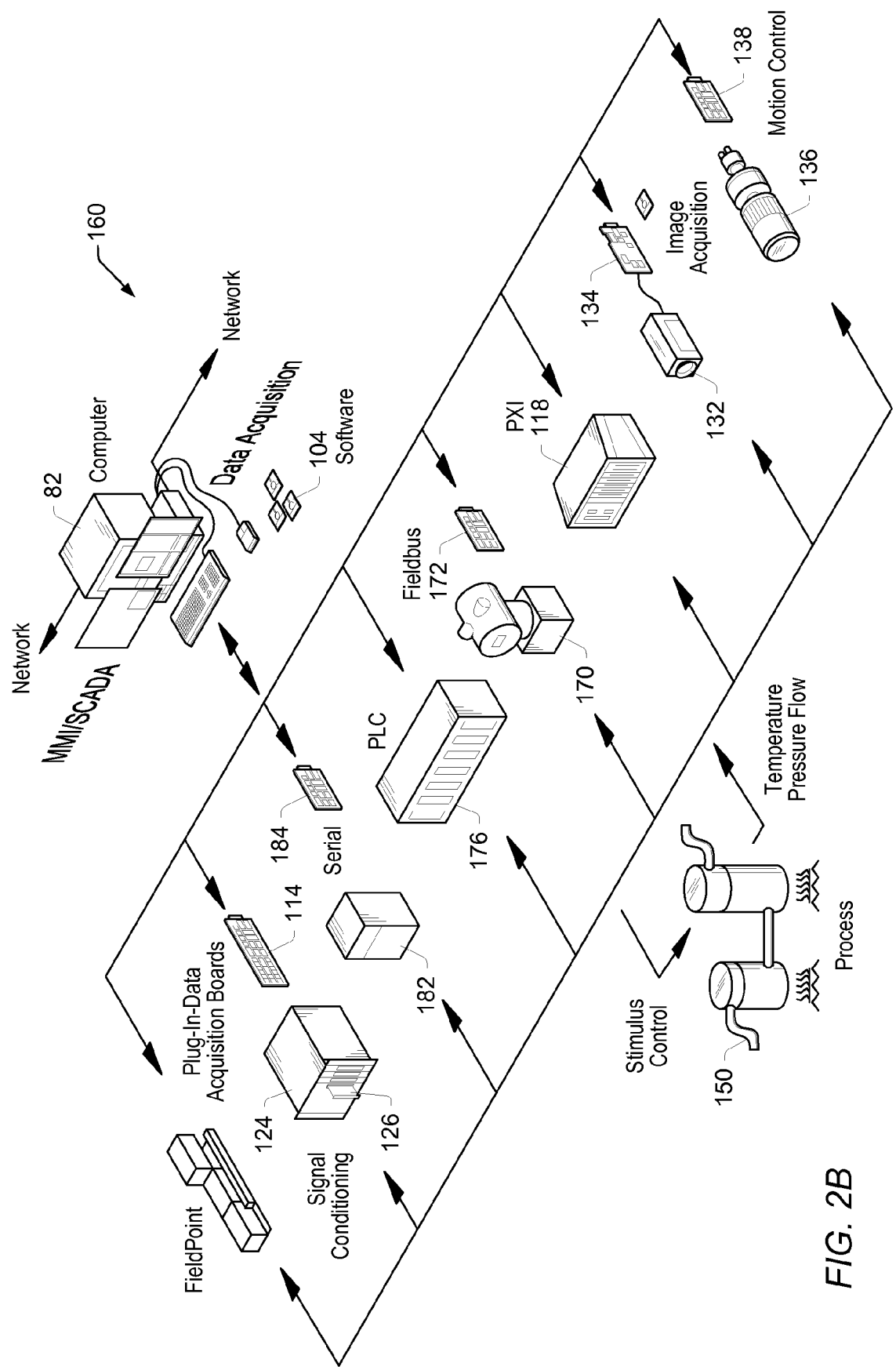
FIG. 2B illustrates an industrial automation system according to one embodiment.

FIGS. 2A and 2B—Exemplary Systems

FIG. 2A illustrates an exemplary instrumentation control system 100 which may implement embodiments of the invention. The system 100 comprises the computer 82 which connects to one or more instruments (which may be or include the target system 90). The host computer 82 may comprise a CPU, a display screen, memory, and one or more input devices such as a mouse or keyboard as shown. The computer 82 may operate with the one or more instruments to analyze, measure or control a unit under test (UUT) or process 150.

The one or more instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to a unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. Similar to above, the devices in the automation system 160 may be or include the target system 90. The system 160 may comprise a computer 82 which connects to one or more devices or instruments. The computer 82 may comprise a CPU, a display screen, memory, and one or more input devices such as a mouse or keyboard as shown. The computer 82 may operate with the one or more devices to a process or device 150 to perform an automation function, such as MMI (Man Machine Interface), SCADA (Supervisory Control and Data Acquisition), portable or distributed data acquisition, process control, advanced analysis, or other control, among others.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

Figure 3A:
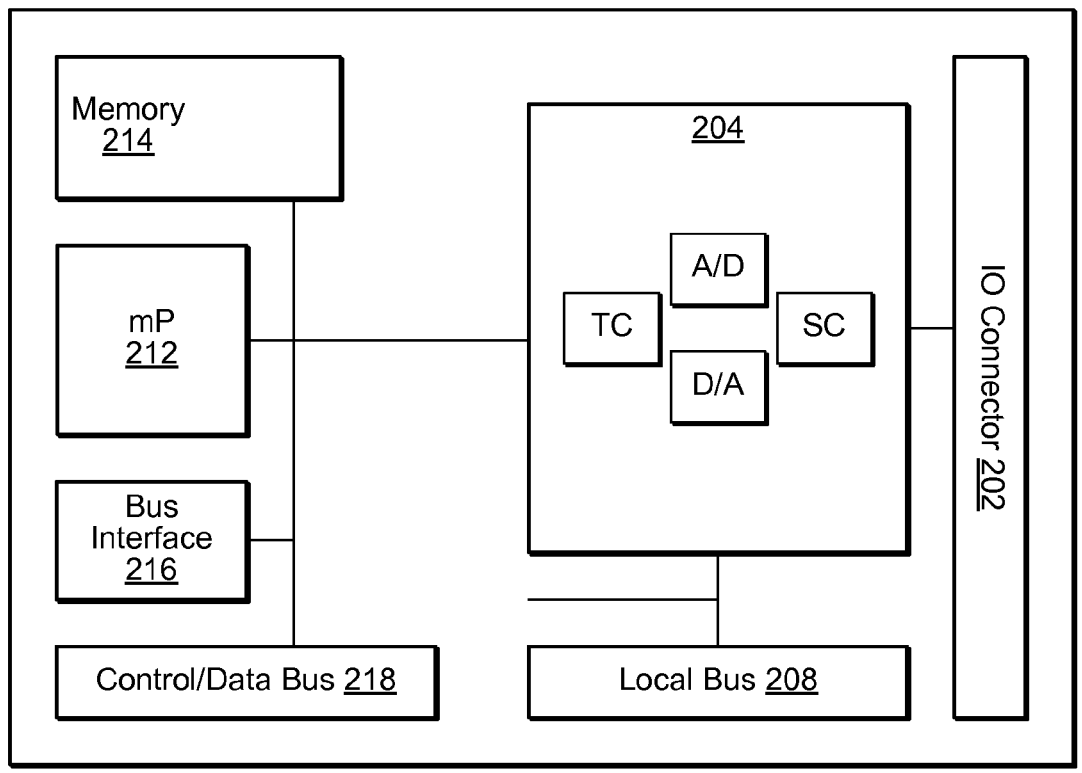
FIGS. 3A and 3B illustrate exemplary block diagrams of a target system according to one embodiment.
Figure 3B:
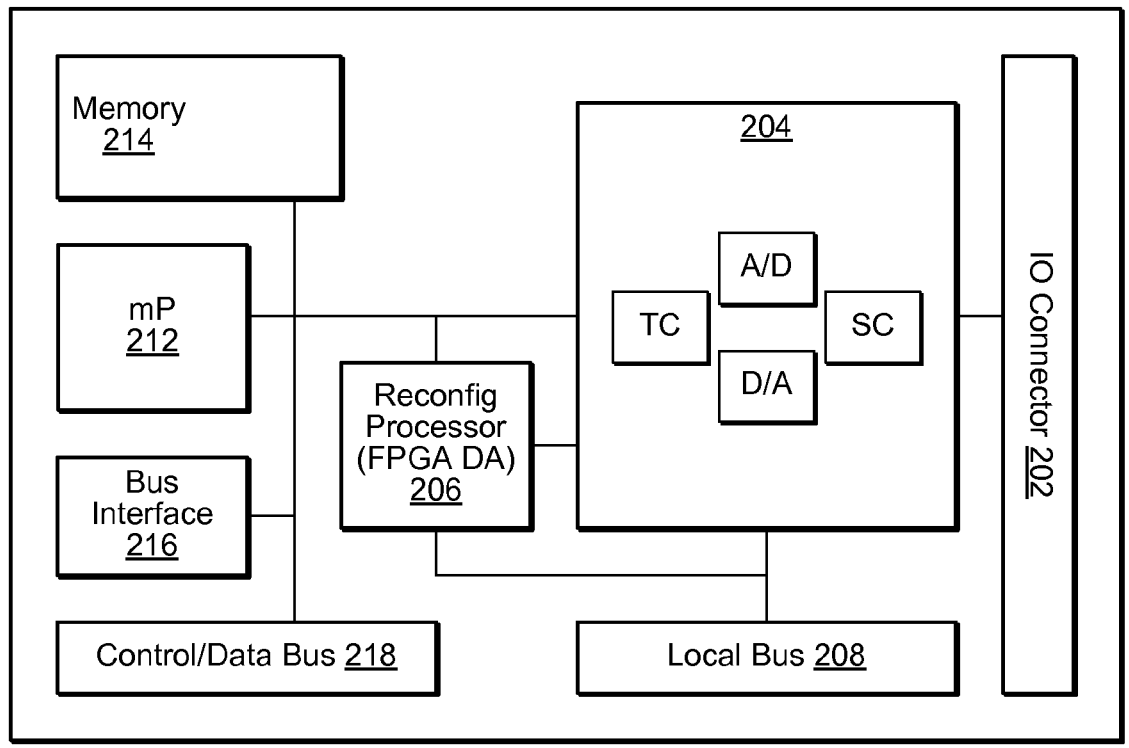

FIGS. 3A and 3B—Exemplary Target System Diagrams

Referring now to FIG. 3A, a block diagram illustrating an exemplary target system is shown. In this example, the target system 90 may be an embedded system, e.g., on an interface card. It is noted that FIG. 3A is exemplary only, and the target system may have various architectures or forms, as desired. In other words, the target system 90 is not limited to the embedded system on the interface card 114 as shown. Furthermore, any descriptions of the interface card 114 below may be modified or applied to the target system 90. As indicated above, the target system 90 in general may be included on any of the various devices shown in the above-described Figures, or on other devices, as desired.

As shown, the interface card 114 includes an I/O connector 202 which is coupled for receiving signals. In some embodiments, the I/O connector 202 presents analog and/or digital connections for receiving/providing analog or digital signals. The I/O connector 202 may be adapted for coupling to SCXI conditioning logic, or is adapted to be coupled directly to a unit under test or process.

The interface card 114 may also include dedicated logic 204 for performing a specific function. In the embodiment of FIG. 3A, the interface card 114 may include data acquisition (DAQ) logic 204. As shown, the data acquisition logic 204 comprises analog to digital (A/D) converters, digital to analog (D/A) converters, timer counters (TC) and signal conditioning (SC) logic as shown. The DAQ logic 204 provides the data acquisition functionality of the DAQ card. In some embodiments, the dedicated logic 204 is comprised on a daughter card which is inserted into a connector on the main card, wherein the main card may include the other components shown in FIG. 3.

According to some embodiments, the interface card 114 includes a dedicated on-board microprocessor 212 and memory 214, referred to as an embedded processor and embedded memory, respectively. This enables a portion of the graphical program or statechart to be compiled into machine language for storage in the memory 214 and execution by the microprocessor 212. The embedded memory 214 may store a kernel providing basic OS services, as well as a graphical programming system run-time engine for real-time execution of compiled graphical programs. The embedded memory 214 is also operable to receive and store a portion or all of a compiled graphical program or statechart for execution in the embedded system. The embedded CPU 212 executes code and data from the embedded memory 214 to implement at least a portion of a virtual instrumentation or industrial automation function.

As shown, the interface card 114 further includes bus interface logic 216 and a control/data bus 218. In some embodiments, the interface card 114 is a PCI bus-compliant interface card adapted for coupling to the PCI bus of the host computer 102, or adapted for coupling to a PXI (PCI eXtensions for Instrumentation) bus. The bus interface logic 216 and the control/data bus 218 thus present a PCI or PXI interface.

The interface card 114 also includes local bus interface logic 208. In the preferred embodiment, the local bus interface logic 208 presents a RTSI (Real Time System Integration) bus for routing timing and trigger signals between the interface card 114 and one or more other devices or cards.

In the embodiment of FIG. 3B, the interface card 114 may include a programmable hardware element or programmable processor 206. In some embodiments, the programmable hardware 206 comprises a field programmable gate array (FPGA) such as those available from Xilinx, Altera, etc. The programmable hardware element 206 is coupled to the DAQ logic 204 and is also coupled to the local bus interface 208. Thus, graphical programs or statecharts can be created on the computer 82, or on another computer in a networked system, and, in this embodiment, one or more graphical programs or statecharts can be converted into embedded hardware implementations, and at least a portion of one or more graphical programs can be converted into hardware implementation forms for execution in the FPGA 206.

Thus, in one embodiment, after one or more graphical programs or statecharts have been created, they may be compiled for execution on the CPU 212 and execute locally on the interface card 114 via the CPU 212 and memory 214, and at least a portion of a second graphical program is translated or converted into a hardware executable format and downloaded to the FPGA 206 for hardware implementation.

In alternate embodiments, the entirety of the graphical program or statechart may be programmed onto the FPGA for operation.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that the present invention can be used for a plethora of applications and is not limited to the above applications. In other words, applications discussed in the present description are exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 4:
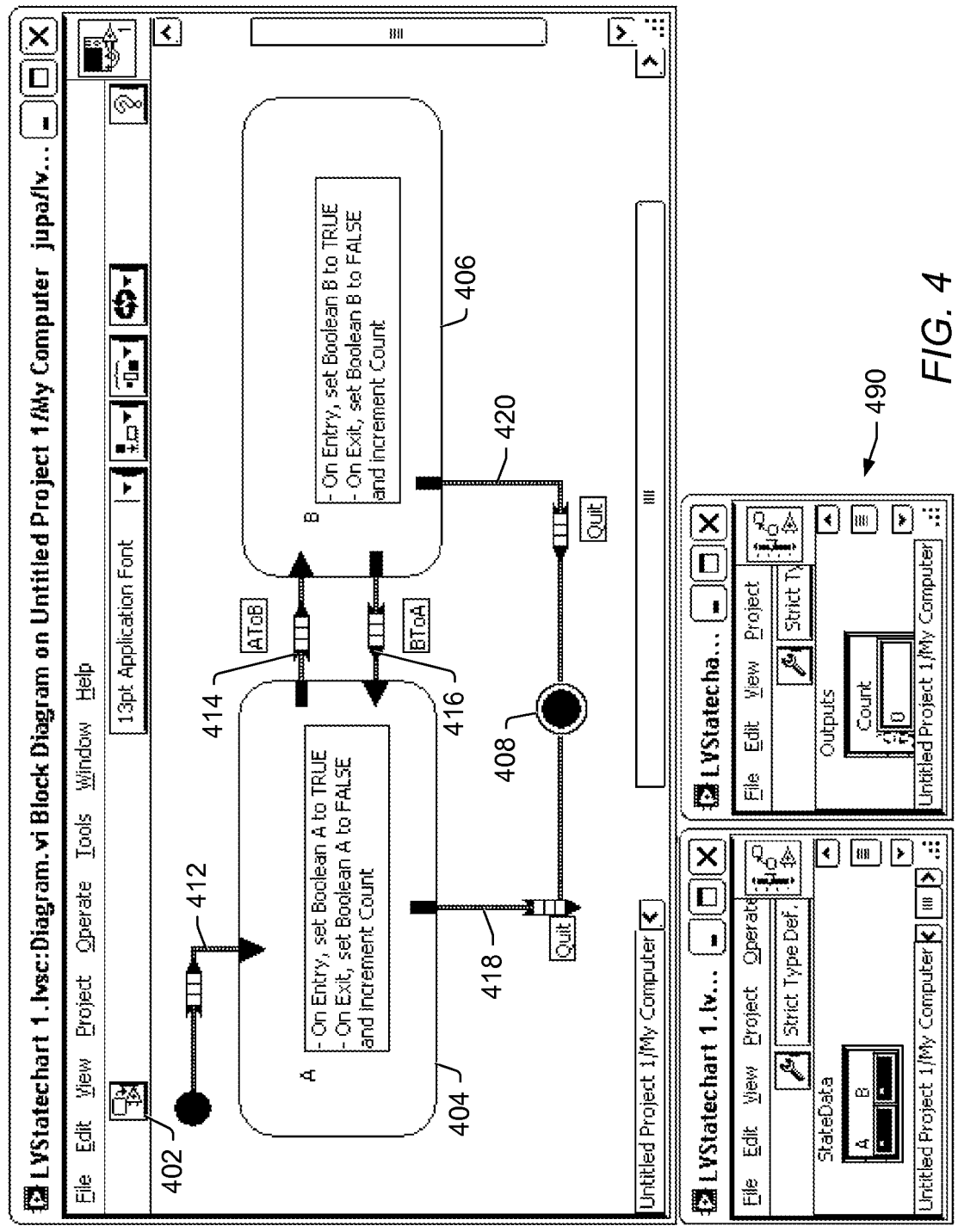
FIG. 4 illustrates an exemplary statechart developing environment with a statechart and associated graphical user interfaces according to one embodiment.

FIG. 4—Exemplary Statechart

As described above, a statechart may include a plurality of state icons connected by wires. The state icons may correspond to respective states and the wires may represent transitions between states (or to and/or from states). Thus, the statechart may include a plurality of state icons which represent states.

In some embodiments, the statechart may include at least one superstate icon which includes one or more substates. As discussed above, the one or more substates may be currently active (e.g., during execution of the statechart) when the superstate is active. Note that the substates may also be superstates. For example, the statechart may include states that themselves include statecharts. Thus, the statechart may indicate a hierarchy among states.

Note that the statechart may be executable to perform first functionality, and the plurality of state icons connected by wires may indicate that functionality. As used herein, references to execution of the statechart (or that it may be executable) refers to execution of data structures or program instructions represented by the statechart, compilation or conversion of the data structures to a form that is executable (e.g., to a graphical program), and/or interpretation. During execution, functionality represented by the statechart (e.g., the states and transitions represented in the statechart) may be performed.

Note further that the statechart performing actions during execution of the statechart may actually refer to actions that are performed by program instructions converted or compiled from the statechart performing the actions. For example, the statechart transitioning from one state to another may refer to corresponding actions being performed during execution of the program instructions created from the statechart. Additionally, where the program instructions are compiled or converted from the statechart, the program instructions may cause the statechart to change its appearance during execution (e.g., indicating current states of execution, transitions, etc.). Thus, execution of the statechart may refer to direct execution or interpretation of program instructions represented by the statechart and/or execution of program instructions compiled or derived from the statechart.

The wires connecting the state icons may represent state transitions between the states. For example, a first state (represented as a first state icon in the statechart) may be linked to a second state (represented as a second state icon) via a transition (represented as a wire). The transition may have associated triggers, guards, and/or actions associated with the transition. For example, during execution of the statechart, an event may occur and may be specified as a trigger for the transition. Accordingly, the guards (or conditions associated with the transition) may be evaluated to determine if the transitions action should be performed or executed. If the conditions are met, the action may be performed, e.g., to execute code associated with the transition. Note that the transition (represented by the wire) may have any combination of associated triggers, guards, or actions. For example, in simple cases, the wire may only have associated triggers which result in a transition from, in this example, the first state to the second state.

In various embodiments, the wire may include an affordance for configuring the transition (e.g., to specify the triggers, guards, and/or actions of the transition). The affordance may be represented as an icon displayed on or proximate to the wire. As used herein, the term "proximate" is intended to indicate an association between the two objects, which, in this case, is the icon and the first wire. In some embodiments, proximate may mean within one or more centimeters or an inch. Alternatively, proximate may mean within a given number of pixels on the display, e.g., 50 or 100 pixels. In other words, the term "proximate" in this context means that the affordance is sufficiently close to the wire such that a user would understand an association between the affordance and the wire.

In some embodiments, the icon representing the affordance (or the wire itself) may visually indicate the associated triggers, guards, and/or actions. For example, the icon may appear as an arrow with three connected rectangles. Each rectangle may be colored or filled in to represent whether the represented transition has respective triggers, guards, and/or actions. The specific number or location of the filled in or colored rectangles may indicate which of these triggers, guards, and/or actions are associated with the transition. Thus, a single filled in rectangle may indicate that only triggers are associated with the transition. Note that these visual indications and descriptions are exemplary only and other embodiments are envisioned. For example, the affordance or wire may take on varying appearances to visually indicate the specific triggers, guards, and/or actions that are associated with the transition. Note that the icon may represent a configurable logic node or transition node. Additionally, configuration of the logic node may correspond to configuration of the wire. Further descriptions regarding configuration of the wire and/or logic node are provided below.

In some embodiments, the statechart may include pseudostates (e.g., forks, joins, and/or junctions). In some embodiments, pseudostates (or certain types thereof) may provide conditional branching for transitions in the statechart. For example, a state icon may be wired to a pseudostate in the statechart and multiple other wires may connect the pseudostate to other state icons in the diagram. Each of these wires may represent transitions with associated triggers, guards, and/or actions (as described above). Thus, the pseudostate may allow for conditioned branching of transitions in the statechart. Note that in various embodiments, transitions between states (e.g., single states, superstates, substates, or concurrently active states) and/or pseudostate may be ordered according to configured priorities (e.g., as specified by the user). These priorities may be assigned using explicit specification (e.g., using labels) or implicit specification (e.g., using orientation or directionality of the wires in the statechart).

During execution, the statechart may react to different events. Each of the states and transitions (among other elements of the statechart) may react to different events during execution of the statechart. In one embodiment, a first state may transition to a second state in response to an event. This may occur, for example, where the first state has a transition whose trigger (possibly among a plurality of triggers) is the event. In some embodiments, the transition may have "guards" or conditions which determine whether or not the transition should occur. If the guards are satisfied (i.e., if the conditions are met), the first state may exit (and possibly execute an action associated with exiting of that state), the transition may occur (and similarly execute associated actions), and the second state may be entered. Actions may then be taken based on the entrance of the second state (which itself is an event). However, it should be noted that actions may be taken even when states are not entered or exited. For example, a state may perform an action in response to a trigger without an entrance or exit of that state. Thus, statecharts may be a reactive programming paradigm in which actions are taken in response to events. Note that multiple actions or transitions may occur in response to events. In some embodiments, as indicated above, the transitions or actions may be prioritized, which may be specified implicitly or explicitly, e.g., by a user. Thus, statecharts may execute and perform actions in response to events.

FIG. 4 illustrates an exemplary statechart in a statechart development environment. As shown, the statechart development environment may include a statechart window 400 which shows the statechart. Additionally, one or more graphical user interfaces (GUIs) that are associated with the statechart may be displayed. In this case, the statechart has two associated GUIs 480 and 490. GUI 480 corresponds to state data and may display an indicator, e.g., during execution of the statechart, which indicates the current active state. GUI 490 includes a count output indicator which may show the current count value for the statechart, e.g., during execution of the statechart. As shown, the statechart includes state icons representing states of the statechart. As shown, the statechart includes a state icon 402 which represents an initial state, state icon 404 which represents state A, state icon 406 which represents state B, and a state icon 408 which represents an ending state. As indicated by the text displayed in the states, Booleans associated with each state are turned to TRUE or FALSE when the state is entered or exited respectively. Additionally, a count value is increased every time a state is exited. As described above, these values are displayed in the GUIs 480 and 490.

Furthermore, the statechart includes a plurality of transitions which are indicated by wires. As shown, wire 412 indicates a transition from the initial state to state A, wire 414 indicates a transition from state A to state B, wire 416 indicates a transition from state B to state A, wire 418 indicates a transition from state A to the ending state, and wire 420 indicates a transition from state B to the ending state. Each wire includes an affordance for configuring the wire. In some embodiments, this affordance may be referred to as a logic node or transition node. In various embodiments, configuring the wire and/or configuring the logic node displayed on the wire may refer to the same action of configuring triggers, guards, and/or actions for the wire. Further descriptions regarding configuration of the wires/transitions represented by the wires are provided below. As also shown, each wire or transition may have an associated label displayed proximate to the wire or logic node of the wire.

Thus, FIG. 4 illustrates an exemplary statechart window which includes a statechart and GUIs which may display data regarding the statechart (e.g., during execution of the statechart).

Figure 5:
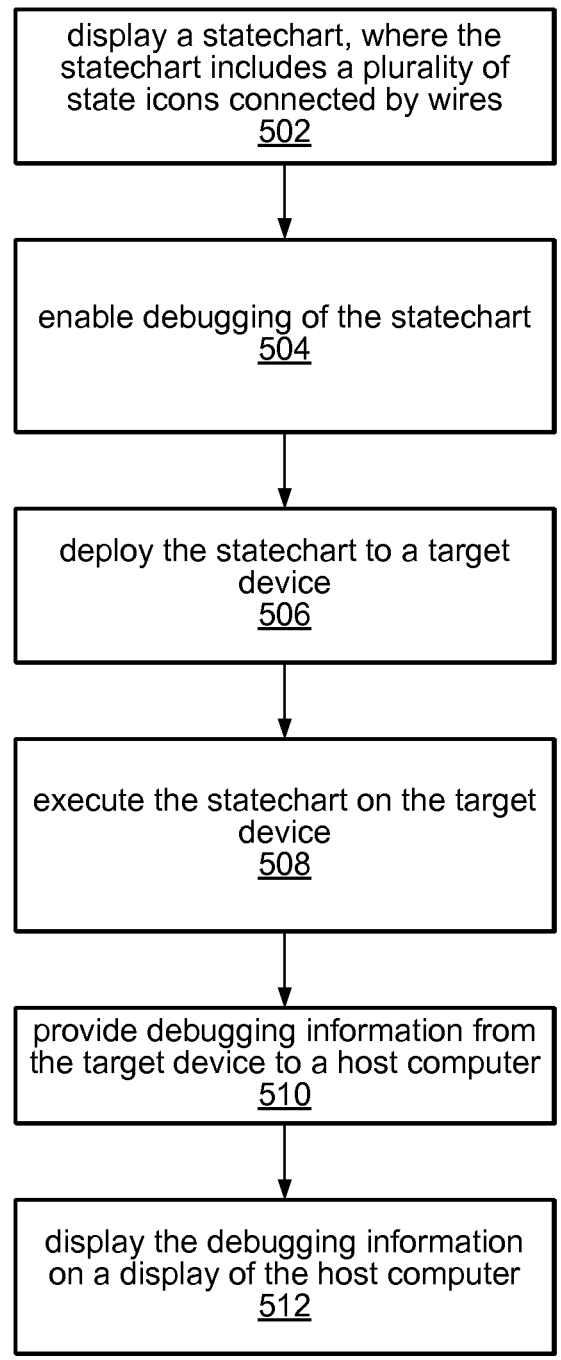
FIG. 5 is a flowchart diagram illustrating one embodiment of a method for debugging a statechart executing on a target device according to one embodiment.

FIG. 5—Method for Debugging a Statechart on a Target System

FIG. 5 illustrates a method for debugging a statechart. The method shown in FIG. 5 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 502, a statechart may be created or displayed on a display, e.g., of the computer system 82, e.g., inside a development environment such as a graphical programming development environment or statechart development environment (e.g., LabVIEW® provided by National Instrument Corp.). The statechart may be executable by a computer (e.g., the computer system 82) to perform first functionality. Additionally, in some embodiments, the statechart may be included as a node in a graphical program. As described above, the statechart may include a plurality of state icons connected by wires, where the state icons represent states and the wires represent transitions between the states. The plurality of state icons connected by wires may visually indicate the first functionality. As also indicated above, the statechart may have hierarchical relationships in states. In other words, the statechart may include superstates which include substates.

Note that the statechart may be displayed in response to user input. In one embodiment, the statechart may be displayed after a user has chosen to open the statechart (e.g., where the statechart has already been created). Alternatively, the statechart may be displayed during or after creation of the statechart (e.g., using a development environment such as those indicated above). The statechart may be created manually or automatically, as desired. For example, the statechart may be created or assembled by the user arranging on a display a plurality of state icons and then manually connecting the state icons to create the statechart. In response to the user assembling the statechart, data structures may be created and stored which represent the statechart.

Alternatively, the user may provide textual input (e.g., to the development environment) and a statechart may be automatically created or completed based on the textual input. The textual input may fully specify the statechart or may partially specify the statechart. Partially specifying the statechart may include specifying desired functionality and/or portions of the states/transitions of the statechart. In one embodiment, the user may provide input to a GUI or series of GUIs (e.g., in a wizard) in order to specify the statechart. The statechart may be automatically created or displayed in response to receiving the user input. Note that automatic creation of the statechart does not require user input manually assembling state icons and wires (e.g., according to the methods described above). Thus, following descriptions from above, the user may provide input specifying functionality and/or portions of the statechart, and the statechart may be automatically created and displayed in response to the user input. Similar descriptions regarding the automatic creation of graphical programs and/or state diagrams can be found in various ones of the documents incorporated-by-reference above.

The statechart may include one or more variables that may be used for debugging or outputting. For example, during creation of the statechart, these variables may be created or specified, e.g., manually by the user or automatically by the statechart development environment. In one embodiment, state data variables which indicate the currently active state may be automatically created and updated during creation of the statechart. Other variables that may be created (automatically or manually) may include count variables (e.g., indicating the number of times states have been entered or exited), internal queue variables (e.g., buffers or arrays which store list(s) of executing or pending triggers/events), trigger variables (e.g., indicating current or pending triggers), and/or other variables. Note that these variables and data structures are exemplary only and that any other types of variables may be created as desired.

In 504, debugging for the statechart may be enabled. In some embodiments, a user may enable debugging for the statechart by selecting a debug option in a menu of the statechart or statechart developing environment. For example, in one embodiment, the user may select the statechart (and/or a specific element in the statechart) and invoke a menu to select a debug option for the statechart (or specific element of the statechart). Note that further embodiments for enabling debugging for the statechart are envisioned. For example, the user may simply begin specifying debugging operations.

After enabling debugging, debugging operations may be specified for the statechart. For example, the user may specify a breakpoint for the statechart (e.g., for halting the statechart during execution of the statechart), a watch (e.g., to monitor various states or variables during execution of the statechart), execution monitoring or highlighting (e.g., so that the user may view the current execution states as the statechart is executing), and/or other debugging operations.

In some embodiments, in response to specification of debugging operations, one or more graphical programs which specify the debugging operation may be generated. In various embodiments, the graphical programs may be automatically generated in response to the debugging operations, or alternatively, may be manually specified by the user, as desired. In one embodiment, the graphical programs may be generated automatically without the user viewing and/or knowing about their existence. In other words, the debugging graphical programs may be invisible or "under the hood".

However, it should be noted that in some embodiments, the user may not need to specify all or some of the debugging operations. For example, after enabling debugging, certain debugging operations may be automatically created or implemented without requiring the user to request or specify them.

In 506, the statechart may be deployed to a target device (such as the target device 90 described above). Deploying the statechart to the target device may also be referred to as configuring the target device according to the statechart. In some embodiments, deploying the statechart may occur when the user chooses to deploy the program, when specifying a target for execution of the statechart, when compiling the statechart, and/or when executing the statechart.

Deploying the statechart may include storing the statechart (or at least a portion of the statechart) in the memory of the target device. In some embodiments, the statechart may be converted to a graphical program and the resulting graphical program may be stored in the memory of the target device. Further, where the target device includes a programmable hardware element (e.g., a field programmable gate array (FPGA)), deploying the statechart may include programming the programmable hardware element (e.g., using a netlist or other hardware configuration file) according to the statechart. In some embodiments, the hardware configuration file may be created by converting the statechart to the hardware configuration file. Alternatively, the statechart may be converted to a graphical program and the corresponding graphical program may be converted to a hardware configuration file for deployment onto the programmable hardware element of the target device. In some embodiments, the target device may include both a memory and processor and a programmable hardware device. The statechart (or a graphical program created based on the statechart) may be deployed in portions to the memory and the programmable hardware element, e.g., for distributed execution on the target device.

Deploying the statechart may also include generating debugging specifications and deploying the debugging specifications to the target device. The debugging specification may include the specification of various debugging operations (e.g., the debugging graphical programs described above). Thus, when debugging options are enabled, the debugging operations may be deployed to the target device such that during execution, the debugging operations may be performed.

The debugging specification may further include a look-up table which may be used to coordinate transmission of debugging information between the target device and a host computer (e.g., the computer 82 described above). The look-up table may include references between the statechart portion for execution by the host computer and the statechart (or corresponding graphical program) for execution on the target device. For example, the table may indicate that when a specific point is reached during execution on the target device, a message or cookie (or other indication) may be sent to the host computer which indicates a corresponding point on a statechart displayed on the host computer.

In some embodiments, the table may include a debug ID in one column and a corresponding statechart activity in another column. Thus, reporting a specific debug ID may indicate a statechart activity, e.g., when provided to a statechart display on the host computer. Special code may be inserted into the deployed statechart code (or provided separately) to send this debug ID to the statechart debug manager entity (the statechart display program) executing on the host computer. Thus, the look-up table may be used to coordinate display of debugging information on the host computer and execution of the statechart on the target device. In some embodiments, the debugging specifications may be included with the statechart or may be deployed separately, as desired.

Note that the user may not enable or specify debugging until the user decides to deploy the statechart to the target device. In other words, in some embodiments, the user may enable debugging, optionally specify debugging operations, and deploy the statechart (e.g., with corresponding debugging specification) in one step or in one graphical user interface. However, any of these steps may be performed at different times or separated, as indicated above.

Additionally, deploying the statechart to the target device may include deploying a runtime execution engine to the target device. In some embodiments, the execution engine may be an operating system which the target device uses to execute graphical programs or statecharts. The execution engine may be a real-time execution engine for executing the statechart in real time with respect to other devices. Deploying the execution engine may include deploying a kernel onto the target device. The runtime engine may include capabilities for interpreting and using the debugging specification (e.g., the table) described above. In some embodiments, the execution engine may be a graphical program execution engine such as the LabVIEW™ execution engine provided by National Instruments Corp. Note that deploying an execution engine to the target device may occur before deploying the statechart, as desired.

In 508, the statechart may be executed on the target device. As indicated above, execution of the statechart by the target device may include execution of a portion or all of the statechart by the target device to implement the first functionality of the statechart. Additionally, execution of the statechart may refer to execution of program instructions stored in a memory medium and/or may refer to operation of the target device which includes a programmable hardware element that is configured according to the statechart. Thus, execution of the statechart on the target device may generally refer to the target device operating and implementing the functionality of the statechart after being configured according to the statechart (as described above).

During execution of the statechart in 510, the target device may provide debugging information or messages to the host computer, e.g., according to the table described above. The host computer may be executing a statechart display program which may listen for debugging messages (e.g., in the form of packages or cookies) from the target device which indicate the current state of execution of the statechart.

In 512, in response to the debugging information, the computer may display the debugging information on the display (e.g., in the statechart displayed on the display). More specifically, the computer may receive debug ID's in messages from the target device and may use a table (similar to the deployed table) to correlate the ID to a specific activity and display corresponding information. For example, in one embodiment, the debugging information may indicate where in execution the statechart is, and the computer may correspondingly highlight the current execution point on the display. As another example, the debugging information may include information regarding the values of variables of the statechart, and the computer may update the value of a watch on the display. Further, the debugging information may indicate that a breakpoint has been reached and may require further input (e.g., from the computer) before continuing to execute.

In some embodiments, the computer may be executing a front panel of a graphical program executing on the target device, and may update the front panel based on information sent from the target device.

The method may further include the computer providing further information to the target device (e.g., debugging commands), e.g., based on the debugging information. For example, following the breakpoint example above, the statechart may cease to execute and may be waiting for further input before resuming execution. In this case, the user may provide input to step through the statechart or resume execution, and in response to this information being provided to the target device, the target device may correspondingly resume execution (although other further information and responses are envisioned).

Furthermore, the user may proactively provide input to the statechart interface displayed on the computer, e.g., to slow down execution of the statechart on the target device, to change inputs or current variables, or other steps. Correspondingly, this information may be provided to the target device and the target device may execute the statechart accordingly.

Thus, a statechart may be executed on a target device and the target device may provide debugging information for display on a computer system during execution.

FIGS. 6-9—Exemplary Graphical Program for Performing a Debugging Operation

The following description discloses an exemplary method for creating a graphical program for debugging a statechart. The method described below may be used in conjunction with any of the computer systems or devices shown in the above Figures, among other devices.

A graphical program which specifies a debugging operation for the statechart may be created. As indicated above, the graphical program may include a block diagram portion and a GUI portion (which may be referred to as a front panel). The block diagram portion may include a plurality of interconnected nodes which visually indicate functionality of the graphical program. For example, each of the nodes may represent software functions or program code and may be connected via wires. The wires may indicate that data produced by one node is provided to another node in the graphical program. Thus, the graphical program may be a data flow graphical program where data is provided between nodes in the graphical program.

In various embodiments, the graphical program may be created automatically or manually as desired. During creation of the graphical program, in 602, one or more inputs of the graphical program may be configured to receive first data produced by the statechart. The first data may include one or more of the values of and/or the variables themselves that were created or specified during creation of the statechart. Thus, in various embodiments, the graphical program may receive data corresponding to the variables specified or created in the statechart. In one embodiment, the graphical program may include a single input which receives the entirety of the values and parses that data (e.g., the input may be an array input). Alternatively, the graphical program may receive data corresponding to each variable on respective inputs. Note that the graphical program may not utilize or necessarily receive input corresponding to every variable of the statechart, but may instead only receive data corresponding to a subset of the variables.

In one embodiment, the graphical program may be created automatically (e.g., by the development environment) and may simply display or visually indicate data of the variables in the front panel of the graphical program. Alternatively, the graphical program may be more complex. For example, the graphical program may specify various debugging operations such as logging the first data (or portions thereof) and/or halting execution of the statechart. Note that these debugging operations may be performed all the time or for a portion of the execution of the statechart, e.g., as specified by the graphical program. For example, the graphical program may specify conditions for when the statechart should be halted or for when various portions of the first data should be recorded. Note that the graphical program may also indicate how the data is logged. For example, the graphical program may perform one or more modifications or transformations on the data before it is logged.

Additionally, the graphical program may include buttons or other input elements which allow the user to interact or modify execution of the statechart (and/or the graphical program). For example, the front panel may include one or more GUI elements for halting execution of the statechart, slowing down execution of the statechart (e.g., to various rates or speeds), stepping through execution of the statechart, beginning or ending logging of data for one or more variables (or sets thereof), and/or other actions related to debugging the statechart. Note that the above described debugging operations and GUI elements are exemplary only and that other debugging operations/GUI elements are envisioned.

Note that the graphical program may or may not be displayed to the user. For example, for such simple cases, it may not be necessary to display the block diagram portion of the graphical program to the user, and instead the variables or state data may be displayed in a GUI (e.g., the front panel of the graphical program) on the display of the computer system.

The front panel of the graphical program may visually indicate values of variables of the statechart. For example, the front panel may include GUI elements which indicate state data such as the currently active state(s), currently executing triggers, pending external triggers, output information from the statechart (e.g., of local variables such as count variables), internal queue information, and/or other information related to execution of the statechart. As indicated above, the front panel may also include GUI input elements which allow the user to interact with execution of the statechart and/or the graphical program.

In various embodiments, the user may modify or rearrange the GUI elements and appearance of the front panel of the graphical program. Note that the front panel may have a first appearance that is automatically generated, but is thereafter customizable. The user may also modify the way that data is provided to or displayed from the statechart or graphical program. For example, the user may choose to view currently active states using LED indicators instead of BOOLEAN values. Alternatively, or additionally, the user may configure output information to be displayed in a graph or level indicator (among others). Thus, the user may configure the input and output elements of the front panel to take on any customized appearance as desired.

Thus, a graphical program may be created automatically or manually and may specify a debugging operation.

As indicated above, the variables may have been specified or created by the user during creation of the statechart, or may be default variables that are created or specified by the development environment. These variables may be visually indicated in the front panel of the graphical program.

Figure 6:
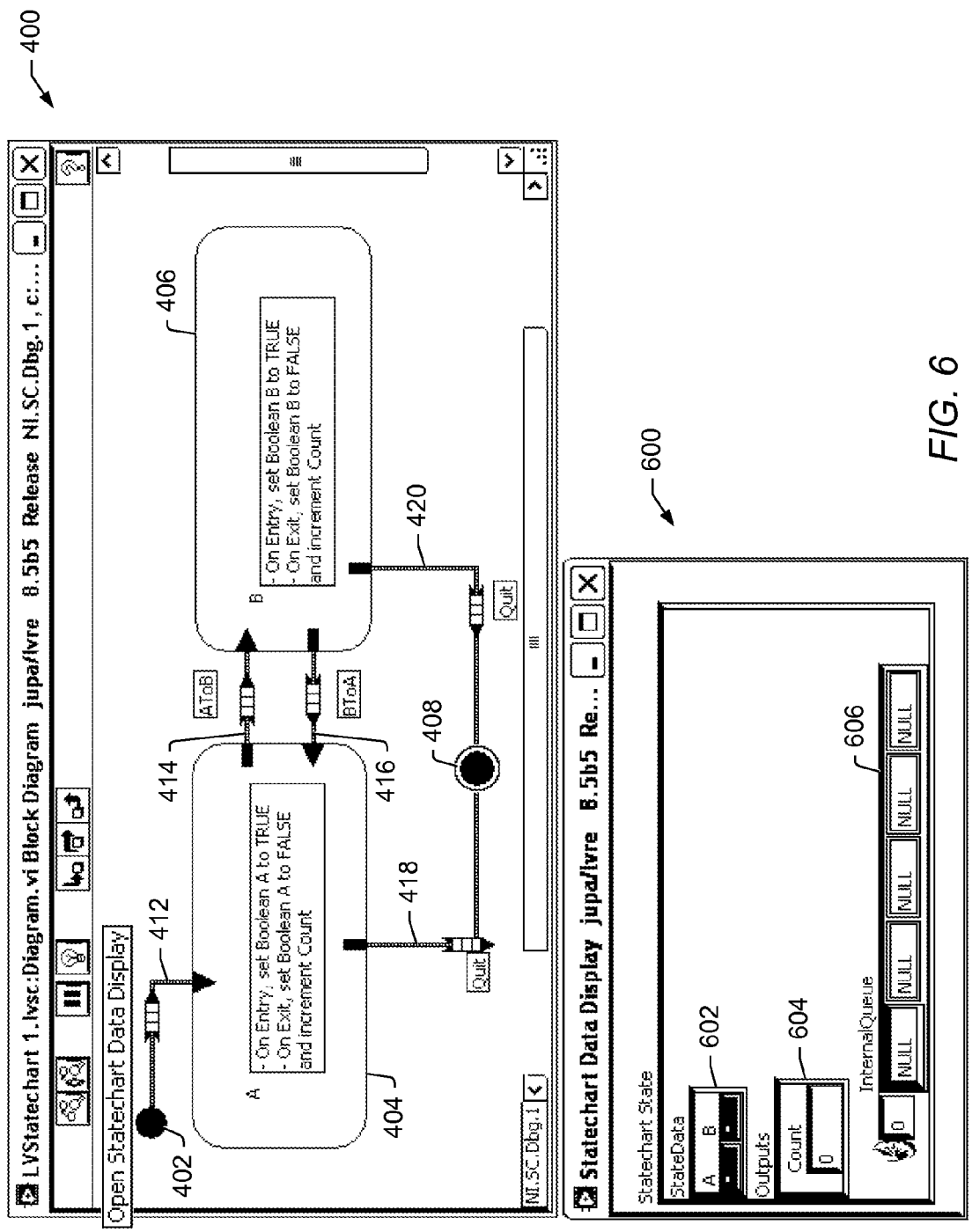
FIGS. 6-12 are exemplary screen shots corresponding to some embodiments of the method of FIG. 5.

FIGS. 6-9 are screenshots illustrating one embodiment for performing a debugging operation of a statechart. As shown in FIG. 6 (which follows from the exemplary statechart of FIG. 4), a data display window 600 may be usable to visually indicate data corresponding to execution of the statechart 400. As shown, the data display window 600 includes GUI element 602 for indicating current state data, GUI element 604 for indicating count variable data (in this case, how many times a state has been exited), and GUI element 606 which indicates an Internal Queue of triggers.

Figure 7:
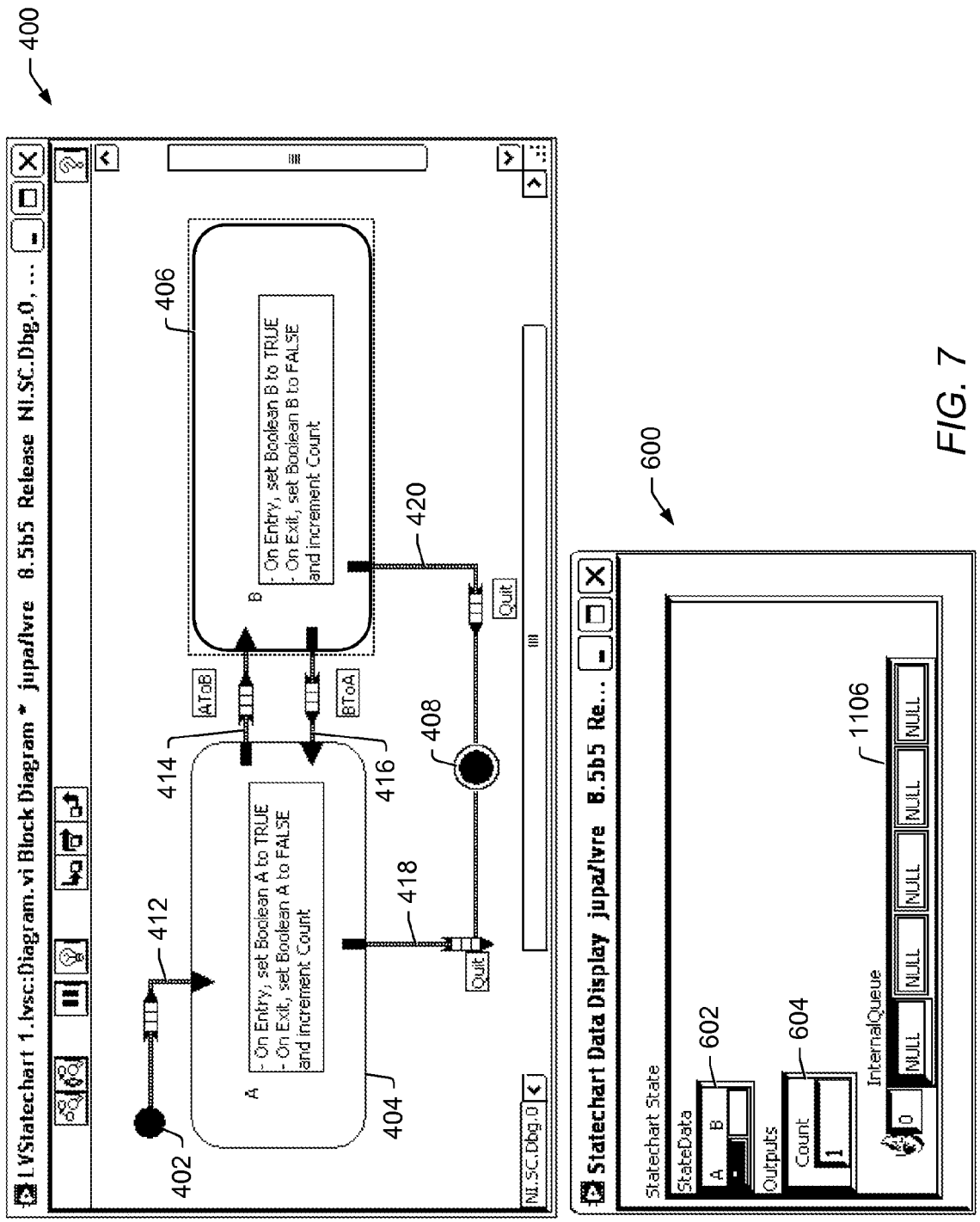

FIG. 7 is a screenshot of the statechart and data display window during execution. As shown, state B is currently being executed (indicated by highlighting or otherwise indicating state icon 406 and via the GUI element 602), only one state has exited (from state A to state B as indicated in the GUI element 604), and no triggers are pending (as indicated by the GUI element 606). Thus, FIG. 7 illustrates an exemplary data display window during execution of the statechart. Note that the data display window could include any number of GUI elements such as a stop and start GUI element for halting or resuming execution of the statechart (such as GUI element 802).

Figure 8:
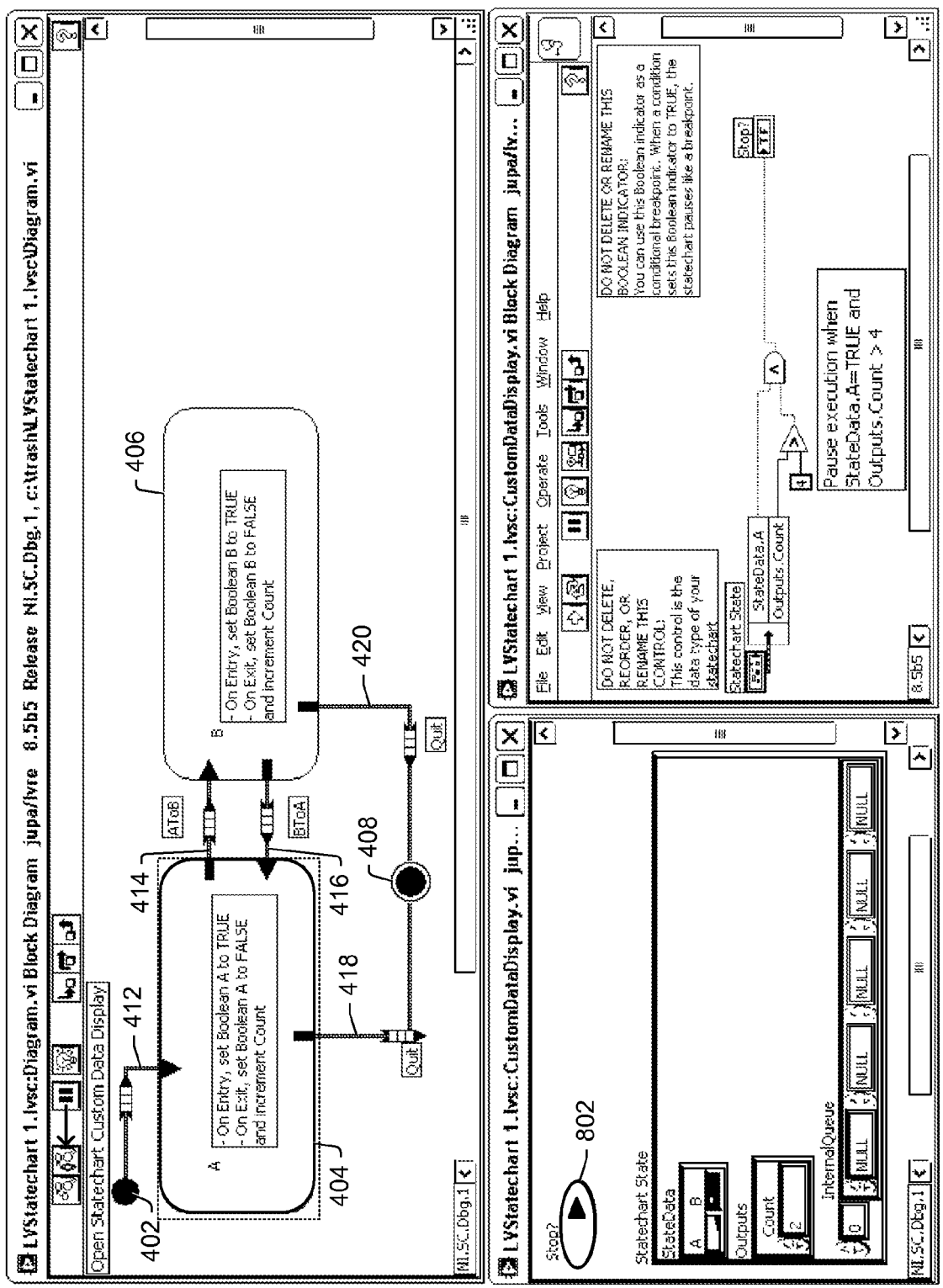
Figure 9:
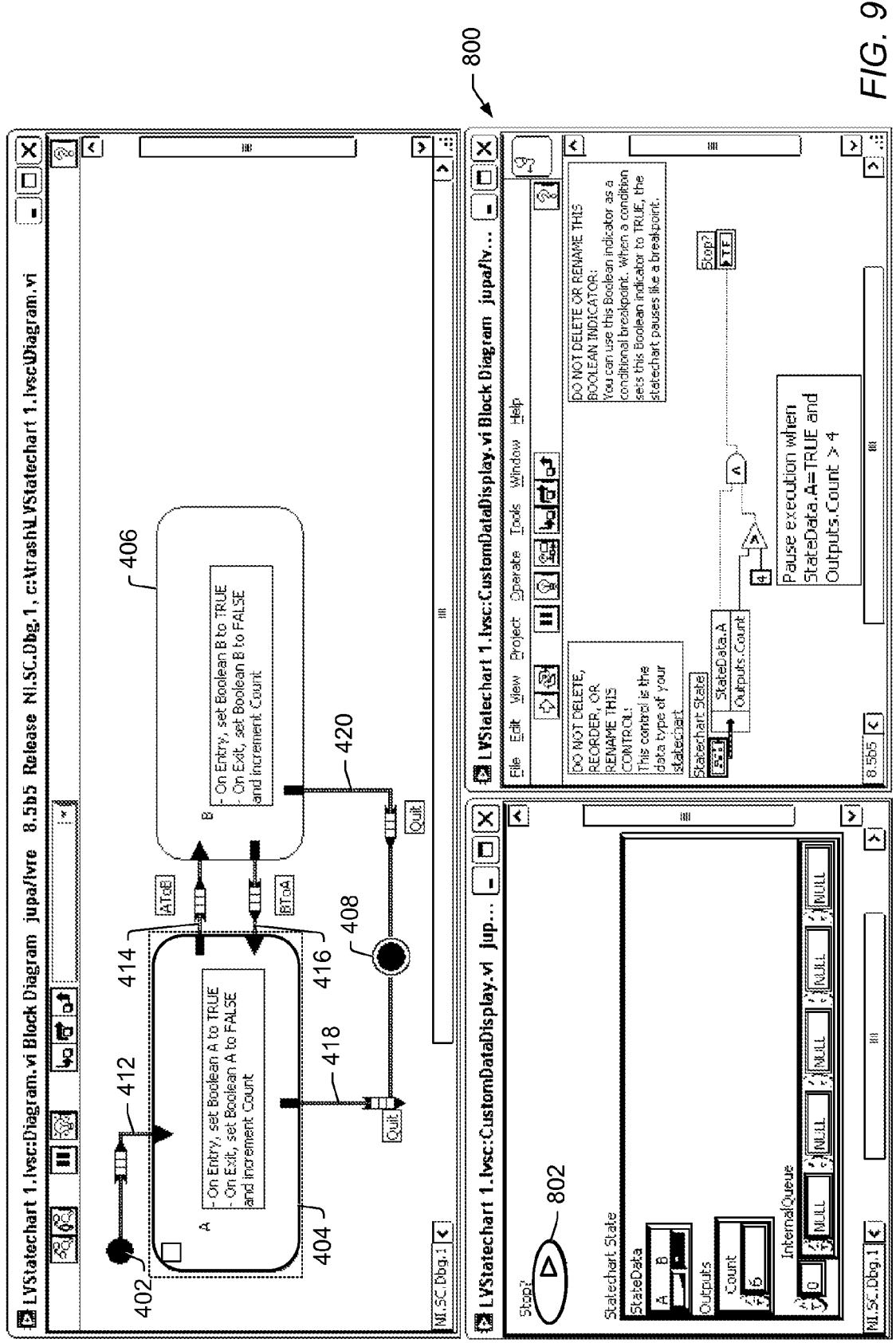

FIG. 8 illustrates a more complex example. As shown, the data display window includes GUI element 802, and a graphical program 800 is also displayed. As also shown, the graphical program receives input from the statechart (e.g., during execution). Among the input is StateData.A (indicating whether state A is active or not) and Outputs.Count (indicating the current number of times a state has exited). As shown, the graphical program specifies that when state A is active and the count variable exceed 4, execution of the statechart will cease. As shown, the statechart has transitioned from A to B and back again (indicated by the count value), and is currently in state A. In FIG. 9, the statechart has halted execution when state A is active and the count value exceeds 4 (in this case, the value is 6). Thus, FIGS. 8 and 9 illustrate a more complex example where a graphical program halts execution of the statechart by using data provided from the statechart during execution.

Figure 10:
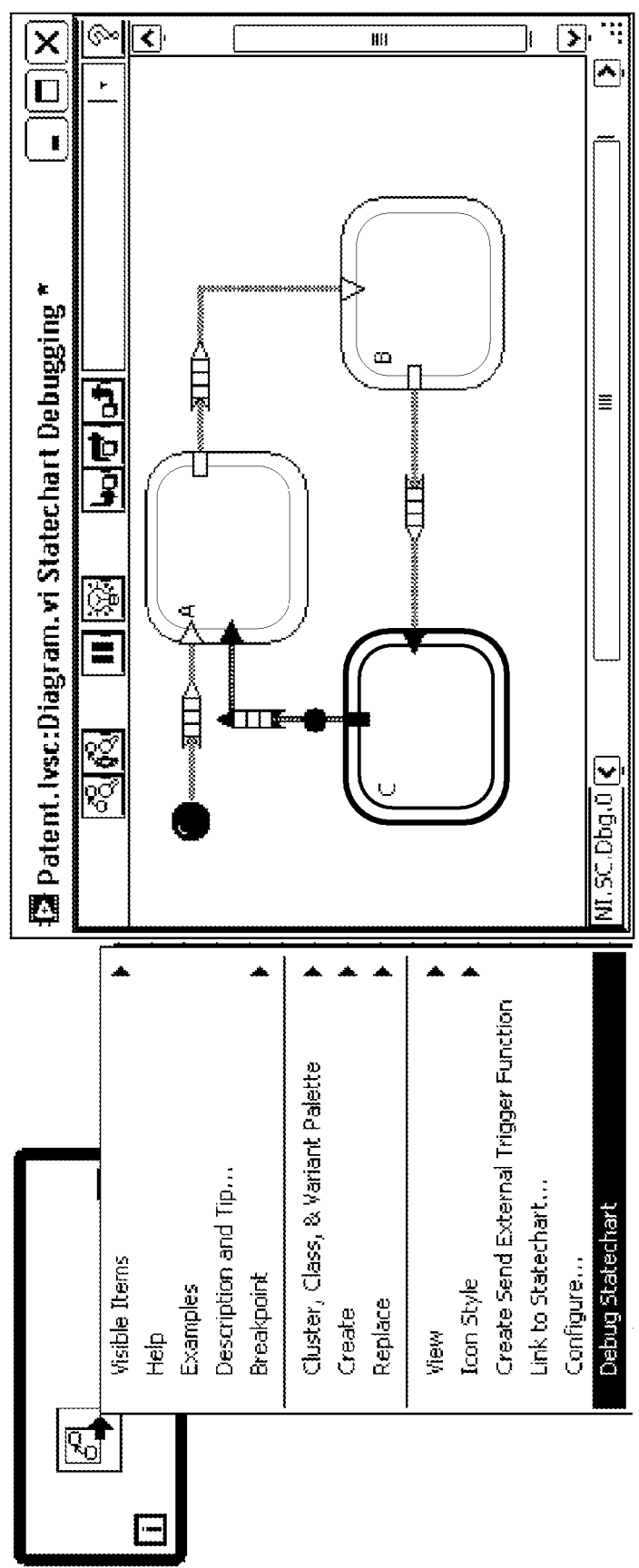
Figure 11:
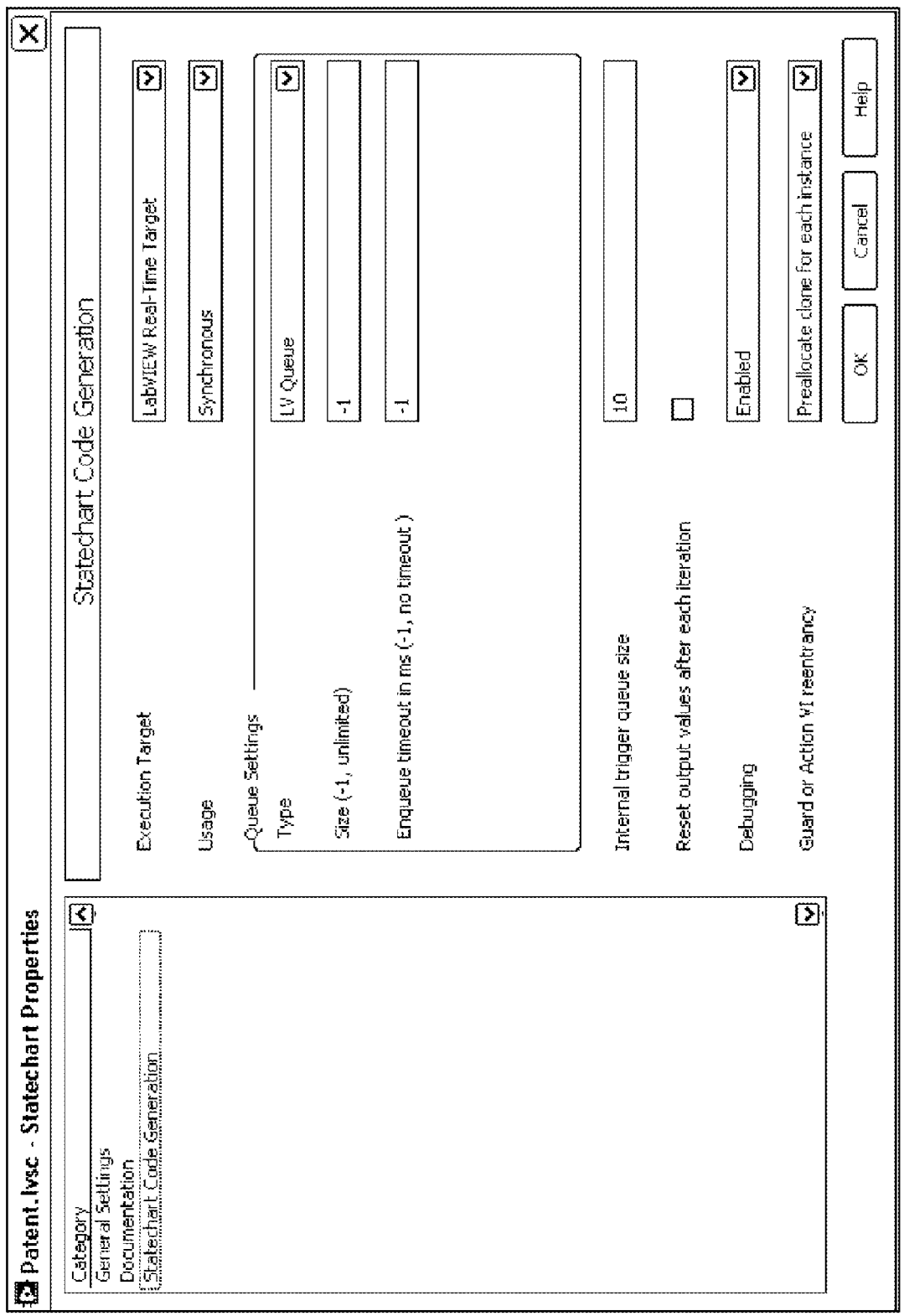
Figure 12:
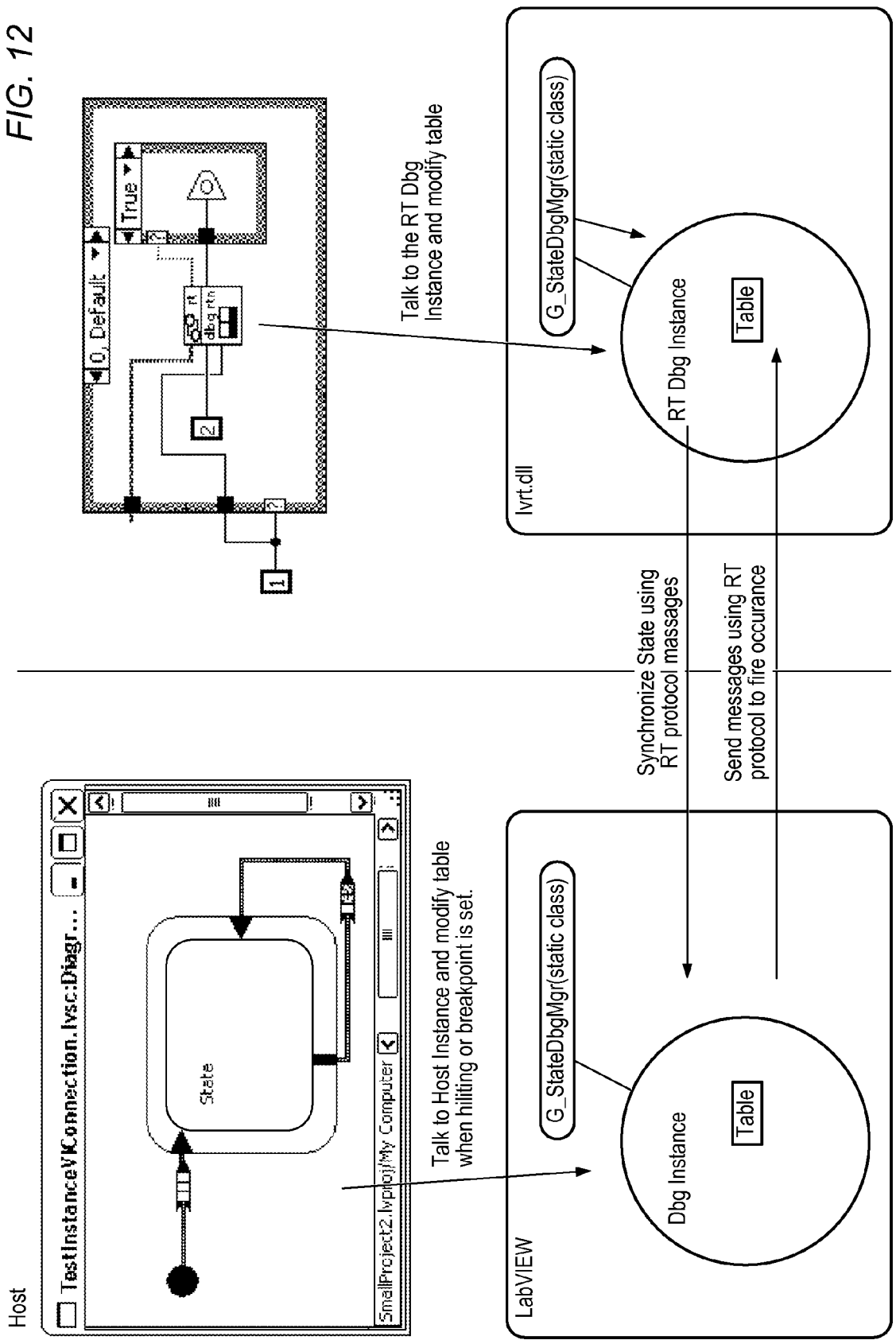

FIGS. 10-12—Debugging a Statechart on a Target Device

FIGS. 10-12 are exemplary screenshots corresponding to debugging a statechart on a target device.

As shown in FIG. 10, a user may enable debugging of a statechart by selecting "debug statechart" from a selection menu of a statechart node in a graphical program. Correspondingly, a statechart debugging window may be displayed on the host computer. In this case, state C and the transition from state C to state A is active, as indicated by the debugging window. As indicated above, when the debug statechart option is enabled, various debugging operations may be automatically generated and incorporated into the statechart for execution on a target device.

FIG. 11 illustrates a statechart properties window where the user may specify various parameters and settings for the statechart. In this case, the user has selected a LabVIEW real time target as the execution target with synchronous usage. Additionally, the debugging option is enabled. In this case, the user has invoked another method for enabling debugging for the statechart, and corresponding debugging specification information may be generated for deployment to the target device. During execution on the target device, the debugging information may be displayed on a debug window similar to the one shown in FIG. 10 above, possibly with current execution highlighting (as also shown in FIG. 10).

As shown in FIG. 12, the graphical program debugging code (described above) and the statechart may be deployed onto a target device. The debugging LabVIEW code may provide current debug ID and/or the debug action for provision to the host computer. More specifically, the debugging code may call into a dll file (in this case LabVIEW lvrt.dll) and pass the current debug ID as well as information the type of debug action.

Correspondingly, the lvrt.dll (which may be executing under or be a part of the executing engine on the target device) may find the corresponding dbg instance table and cache all current active debug IDs. If there is a current open connection to a host machine that is monitoring debugging, the debug ID may be sent to the host as well. Alternatively, the execution engine may use the debug ID and table to determine execution information (e.g., current active state or other execution information) and provide that information to the host computer.

The host may receive the debug ID and use a table to look up the current active state or debugging operation. Alternatively, the host may receive execution information from the target device. The host may update highlighting and breakpoint information accordingly.

The statechart diagram shown may be displayed on the host computer (and may be displayed in response to a statechart debugging window program executing on the host computer). Alternatively, or additionally, a front panel of the debugging graphical program (e.g., whose block diagram may be executing on the target device) may be displayed on the host computer. As indicated above, the statechart diagram and/or front panel may display debugging information based on the debug ID/execution information provided by the target device. As also indicated above, the target device may use the debug instances/ID to look into the deployed debugging specification (e.g., the table) to determine if a breakpoint should occur, or which messages to provide for highlighting purposes. The target device may wait for occurrence cookies, e.g., for responses from the host computer.

Thus, FIG. 12 illustrates the relationship between the host computer and the target device. As shown, the host computer may execute a listener program which updates a statechart debugging window displayed on the host computer. The listener program may communicate with the target device using a protocol such as a real-time protocol. Where appropriate, the host may send a command to the execution engine on the target device to pause execution when needed, among other possible functions.

The target device, on the other hand, may execute the statechart using a runtime engine. Executing the statechart may include executing debugging code (such as a graphical program as shown) which may provide debug ID actions to the execution engine. The execution engine may use a lookup table to provide statechart debugging information to the host computer for display.

Thus, a statechart implemented and/or executing on a target device may be debugged, e.g., using a host computer coupled to the target device.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A method comprising:
   creating a statechart in response to user input, wherein the statechart comprises a plurality of state icons connected by wires, wherein the state icons correspond to respective states, wherein the wires correspond to transitions to and from the states;
   creating one or more debugging specifications based on the statechart, wherein the one or more debugging specifications include program code for implementing one or more debugging operations for the statechart, wherein at least a portion of the program code is created in response to user input;
   configuring the real time target according to the statechart;
   configuring the real time target according to the one or more debugging specifications, wherein configuring the real time target according to the one or more debugging specifications comprises deploying the program code of the one or more debugging specifications to the real time target and configuring the real time target with code executable to lookup information from a data structure to send to the host computer during execution of the statechart in order to coordinate a display of debugging information on the host computer with the execution of the statechart on the real time target;
   the real time target executing according to the statechart and the one or more debugging specifications, wherein said executing comprises performing the one or more debugging operations and generating the debugging information based on the one or more debugging specifications;
   the real time target providing the debugging information to the host computer for display, wherein the debugging information is useable to evaluate execution of the statechart on the real time target for debugging;
   the real time target receiving one or more debugging commands from the host computer during execution of the statechart; and
   the real time target performing one or more additional debugging operations in response to the one or more debugging commands.

2. The method of claim 1, wherein said configuring the real time target according to the statechart comprises storing at least a portion of the statechart in a memory medium of the real time target.

3. The method of claim 1, wherein said configuring the real time target according to the statechart comprises configuring a programmable hardware element of the real time target according to the statechart.

4. The method of claim 1, wherein said configuring the real time target according to the statechart comprises deploying a real time operating system to the real time target.

5. The method of claim 1, wherein said creating the one or more debugging specifications comprises creating one or more graphical programs, wherein the program code for implementing the one or more debugging operations is included in the one or more graphical programs, wherein said configuring the real time target according to the one or more debugging specifications comprises deploying the one or more graphical programs to the real time target, wherein said executing comprises executing the one or more graphical programs to perform the one or more debugging operations.

6. The method of claim 1, wherein a first portion of the program code of the one or more debugging specifications is created in response to user input, and wherein a second portion of the program code of the one or more debugging specifications is created automatically.

7. The method of claim 1, wherein the program code for implementing one or more debugging operations for the statechart comprises graphical data flow code, wherein at least a portion of the graphical data flow code is created in response to user input.

8. The method of claim 1, wherein the program code for implementing the one or debugging operations is configured to receive values of one or more variables produced by the statechart during the execution of the statechart and provide the values of the one or more variables to the host computer for display by the host computer.

9. A non-transitory memory medium comprising program instructions for providing debugging information of a statechart executing on a real time target, wherein the memory medium is comprised in the real time target, and wherein the program instructions are executable to:
   in response to receiving the statechart, store the statechart on the memory medium of the real time target, wherein the statechart comprises a plurality of state icons connected by wires, wherein the state icons correspond to respective states, wherein the wires correspond to transitions to and from the states;
   in response to receiving one or more debugging specifications created based on the statechart, store the one or more debugging specifications on the memory medium of the real time target, wherein the one or more debugging specifications include program code for implementing one or more debugging operations for the statechart, wherein said storing the one or more debugging specifications on the memory medium comprises configuring the memory medium with code executable to lookup information from a data structure to send to the host computer during execution of the statechart in order to coordinate a display of debugging information on the host computer with the execution of the statechart on the real time target;
   execute the statechart and the program code of the one or more debugging specifications on the real time target, wherein said executing comprises performing the one or more debugging operations and generating the debugging information based on the one or more debugging specifications;
   provide the debugging information to the host computer for display, wherein the debugging information is useable to evaluate execution of the statechart on the real time target for debugging;
   receive one or more debugging commands from the host computer during execution of the statechart; and
   perform one or more additional debugging operations in response to the one or more debugging commands.

10. The non-transitory memory medium of claim 9, wherein the one or more debugging specifications comprise one or more graphical programs, wherein the program code for implementing the one or more debugging operations is included in the one or more graphical programs, wherein said executing the program code of the one or more debugging specifications on the real time target comprises executing the one or more graphical programs to perform the one or more debugging operations.

11. A method for displaying debugging information of a statechart executing on a real time target, comprising:
   a host computer system creating the statechart in response to user input, wherein the statechart comprises a plurality of state icons connected by wires, wherein the state icons correspond to respective states and wherein the wires correspond to transitions to/from the states, wherein the statechart is executable to perform first functionality;

the host computer system creating one or more debugging specifications based on the statechart, wherein the one or more debugging specifications include program code for implementing one or more debugging operations for the statechart, wherein at least a portion of the program code is created in response to user input;

the host computer system providing first information to the real time target to configure the real time target according to the statechart;

the host computer system providing second information to the real time target to configure the real time target according to the one or more debugging specifications, wherein providing the second information includes providing the program code of the one or more debugging specifications to the real time target and providing the real time target with code executable to lookup information from a data structure to send to the host computer during execution of the statechart in order to coordinate a display of debugging information on the host computer with the execution of the statechart on the real time target;

the host computer system initiating execution of the statechart and the one or more debugging specifications on the real time target, wherein the execution of the statechart and the one or more debugging specifications on the real time target comprises performing the one or more debugging operations and providing the debugging information to the host computer system;

the host computer system receiving the debugging information, wherein the debugging information is usable to evaluate execution of the statechart;

the host computer system providing one or more debugging commands to the real time target during execution of the statechart, wherein the real time target is configured to perform one or more additional debugging operations based on the debugging commands to generate additional debugging information;

the host computer system receiving the additional debugging information from the real time target, wherein the additional debugging information is also usable to evaluate execution of the statechart; and the host computer system displaying visual indications related to the debugging information and the additional debugging information on the display.

12. The method of claim 11, wherein configuring the real time target according to the statechart comprises storing at least a portion of the statechart in a memory medium of the real time target.

13. The method of claim 11, wherein configuring the real time target according to the statechart comprises configuring a programmable hardware element of the real time target according to the statechart.

14. The method of claim 11, wherein configuring the real time target according to the statechart comprises deploying a real time operating system to the real time target.

15. The method of claim 11, wherein said creating the one or more debugging specifications comprises creating one or more graphical programs, wherein the program code for implementing the one or more debugging operations is included in the one or more graphical programs, wherein said configuring the real time target according to the one or more debugging specifications comprises configuring the real time target according to the one or more graphical programs.

16. A non-transitory memory medium comprising program instructions for displaying debugging information of a statechart executing on a real time target, wherein the memory medium is comprised in a host computer coupled to the real time target, wherein the program instructions are executable to:

create the statechart in response to user input, wherein the statechart comprises a plurality of state icons connected by wires, wherein the state icons correspond to respective states and wherein the wires correspond to transitions to/from the states, wherein the statechart is executable to perform first functionality;

create one or more debugging specifications based on the statechart, wherein the one or more debugging specifications include program code for implementing one or more debugging operations for the statechart, wherein at least a portion of the program code is created in response to user input;

provide information from the host computer to the real time target to configure the real time target according to the statechart;

provide the one or more debugging specifications from the host computer to the real time target, wherein providing the one or more debugging specifications includes providing the program code of the one or more debugging specifications to the real time target and providing the real time target with code executable to lookup information from a data structure to send to the host computer during execution of the statechart in order to coordinate a display of debugging information on the host computer with the execution of the statechart on the real time target;

receive the debugging information from the real time target in response to the real time target executing the statechart and the program code of the one or more debugging specifications, wherein the debugging information is usable to evaluate execution of the statechart;

provide one or more debugging commands to the real time target during execution of the statechart, wherein the real time target is configured to perform one or more additional debugging operations based on the debugging commands to generate additional debugging information;

receive the additional debugging information from the real time target, wherein the additional debugging information is also usable to evaluate execution of the statechart; and display visual indications related to the debugging information and the additional debugging information on a display of the host computer.

17. The non-transitory memory medium of claim 16, wherein said creating the one or more debugging specifications comprises creating one or more graphical programs, wherein the program code for implementing the one or more debugging operations is included in the one or more graphical programs, wherein said providing the one or more debugging specifications to the real time target comprises providing the one or more graphical programs to the real time target.

18. The method of claim 1, further comprising:
generating additional debugging information based on said performing the one or more additional debugging operations; and providing the additional debugging information to the host computer, wherein the additional debugging information is usable to evaluate execution of the statechart on the real time target for debugging.

19. The non-transitory memory medium of claim 9, wherein the program instructions are further executable to:

generate additional debugging information based on said performing the one or more additional debugging operations; and provide the additional debugging information to the host computer, wherein the additional debugging information is usable to evaluate execution of the statechart on the real time target for debugging.

* * * * *